(12) United States Patent
Sarkar et al.

(10) Patent No.: US 9,015,011 B2
(45) Date of Patent: Apr. 21, 2015

(54) ASSISTANT TOOL

(75) Inventors: Santonu Sarkar, Bangalore (IN); Vibhu S. Sharma, Aligarh UP (IN); Rajiv Argawal, Gangtok (IN); Kunal Verma, Sunnyvale, CA (US); Alex Kass, Palo Alto, CA (US)

(73) Assignee: Accenture Global Services Limited, Dublin (IE)

( * ) Notice: Subject to any disclaimer, the term of this patent is extended or adjusted under 35 U.S.C. 154(b) by 336 days.

(21) Appl. No.: 13/173,918

(22) Filed: Jun. 30, 2011

(65) Prior Publication Data
US 2012/0191430 A1 Jul. 26, 2012

(30) Foreign Application Priority Data

Jan. 25, 2011 (IN) .............................. 237/CHE/2011

(51) Int. Cl.
*G06F 17/50* (2006.01)
*G06Q 10/00* (2012.01)
*G06F 9/44* (2006.01)

(52) U.S. Cl.
CPC . *G06Q 10/00* (2013.01); *G06F 8/10* (2013.01)

(58) Field of Classification Search
None
See application file for complete search history.

(56) References Cited

U.S. PATENT DOCUMENTS

| 7,716,254 | B2 * | 5/2010 | Sarkar et al. .................. 707/803 |
| 8,365,138 | B2 * | 1/2013 | Iborra et al. ................... 717/104 |
| 2004/0024630 | A1 * | 2/2004 | Ganesan et al. ................. 705/8 |
| 2009/0138793 | A1 * | 5/2009 | Verma et al. ................... 715/234 |
| 2011/0214104 | A1 * | 9/2011 | Sharma et al. ................. 717/105 |
| 2011/0239183 | A1 * | 9/2011 | Paradkar et al. ............... 717/104 |
| 2013/0060546 | A1 * | 3/2013 | Berenbach et al. ............... 703/6 |

OTHER PUBLICATIONS

Christoph Becker, ReUse Cases: Supporting Knowledge Management and Reuse with Self-Organizing Use Case Maps. Master Thesis at the Institute for Software Technology and Interactive Systems at the Vienna University of Technology, Mar. 2006.*

Gholamreza Shahmohammadi, Saeed Jalili, Seyed Mohammad Hossein Hasheminejad, "Identification of System Software Components Using Clustering Approach", Journal of Object Technology, vol. 9, No. 6 (Nov. 2010), pp. 77-98, doi:10.5381/jot.2010.9.6.a4.*

Soo Ho Chang, Man Jib Han, Soo Dong Kim, A Tool to Automate Component Clustering and Identification, Fundamental Approaches to Software Engineering Lecture Notes in Computer Science vol. 3442, 2005, pp. 141-144.*

Kumar, S.; Bhatia, R., "Object use-cases clustering using MDL," Communication Software and Networks (ICCSN), 2011 IEEE 3rd International Conference on , vol., No., pp. 441,445, May 27-29, 2011 doi: 10.1109/ICCSN.2011.6014604.*

(Continued)

*Primary Examiner* — Omar Fernandez Rivas
*Assistant Examiner* — Robert Brock
(74) *Attorney, Agent, or Firm* — Brinks Gilson Lione

(57) ABSTRACT

A design assistant tool may automatically generate a functional design diagram representative of a system based on a processed requirements specification including a plurality of processed requirement statements and use cases. The design assistant tool may apply heuristic rules to the processed requirement statements and/or the processed use cases to determine various components of a functional design diagram. The design assistant tool may generate a technical design module based on the functional design diagram. The design assistant tool may allow various aspects of the functional design diagram to be modified to generate the technical design diagram.

21 Claims, 19 Drawing Sheets

(56) References Cited

OTHER PUBLICATIONS

S.K.Mishra, Dr.D.S.Kushwaha, and Prof.A.K.Misra: "Creating Reusable Software Component from Object-Oriented Legacy System through Reverse Engineering", in Journal of Object Technology, Jan.-Feb. 2009, pp. 133-152 http://www.jot.fm/issues/issue_2009_07article3/.*

Santonu Sarkar, Vibhu Saujanya Sharma, Rajiv Agarwal, Creating Design from Requirements and Use Cases: Bridging the Gap between Requirement and Detailed Design, Proceeding ISEC '12 Proceedings of the 5th India Software Engineering Conference, pp. 3-12, ACM New York, NY, USA, 2012.*

Soo Dong Kim; Soo-Ho Chang, "A systematic method to identify software components," Software Engineering Conference, 2004. 11th Asia-Pacific, 8 pages, Nov. 30-Dec. 3, 2004 doi: 10.1109/APSEC.2004.11.*

IEEE Standard for Information Technology—Systems Design—Software Design Descriptions, IEEE Std 1016-2009, 2009, 40 pages.

*Interactive Computation: The New Paradigm*, Dina Goldin et al. Eds., Springer-Verlag, copyright 2006, 489 pages.

Anandha Mala, G.S. et al., "Automatic Construction of Object-Oriented Design Models [UML Diagrams] from Natural Language Requirements Specification," PRICAI, 2006, pp. 1155-1159.

Apache OpenNLP, The Apache Software Foundation, 2010, printed from the internet at <http://incubator.apache.org.opennlp/index.html> on Aug. 22, 2011, 2 pages.

Appfuse, 2008, printed from the internet at <http://appfuse.org/display/APF/Home> on Aug. 16, 2011, 2 pages.

Baader, F. et al., Chapter 3, Description Logics, Elsevier, 2007, 47 pages.

Basler, M. et al., "Introducing the Java Pet Store 2.0 Application," 2007, printed from the Internet at <http://java.sun.com/jsp.utils/PrintPage.jsp?url=http%3A%2F%2Fjava.sun.com%2Fdevelo . . . > on Aug. 17, 2011, 10 pages.

Boer, R. C. D., Lago, P., Telea, R., and Vliet, H. V. 2009. Ontology-Driven Visualization of Architectural Design Decisions. In 8th Working IEEE/IFIP Conference on Software Architecture (WICSA). IEEE Computer Society, 43-52.

Booch, G. et al., *The Unified Modeling Language User Guide*, 2nd Ed., Addison-Wesley, copyright 2005, 478 pages.

Brooks, F. P. Jr., *The Mythical Man-Month*, Essays on Software Engineering, Anniversary Edition, Addison-Wesley, 1995, 325 pages.

Buhr, R. J. A., "Use Case Maps as Architectural Entities for Complex Systems," IEEE Transactions on Software Engineering, vol. 24, No. 12, 1998, pp. 1131-1155.

Clements, P. et al., "Documenting Software Architectures," Addison Wesley, 2001, 342 pages.

Crain, A., "The Simple Artifacts of Analysis and Design, " IBM Software Group, 2004, printed from the internet at <http://www.ibm.com/developerworks/rational/library/4871.html> on Aug. 18, 2011, 7 pages.

Dashofy, E. M. et al., "A Comprehensive Approach for the Development of Modular Software Architecture Description Languages," ACM Transactions on Software Engineering and Methodology, vol. 14, No. 2, 2005, pp. 199-245.

Eclipse Modeling Framework Project (EMF), printed from the internet at <www.eclipse.org/modeling/emf> on Jun. 23, 2011, 5 pages.

Glass, R. L., *Facts and Fallacies of Software Engineering*, Addison Wesley, copyright 2003, 150 pages.

Grunbacher, P. et al., "Reconciling Software Requirements and Architectures: The CBSP Approach," Proceedings of the 5th IEEE International Symposium on Requirements Engineering, Toronto, Canada, 2001, 10 pages.

Hailpern, B. et al., "Model-Driven Development: The Good, the Bad, and the Ugly," IBM Systems Journal, vol. 45, No. 3, 2006, pp. 451-461.

Hall, J. G. et al., "Relating Software Requirements and Architectures using Problem Frames," The Open University, UK, 8 pages.

IBM DeveloperWorks: Rational Software Architect, printed from the internet at <http://www.ibm.com/developerworks/rational/products/rsa/> on Aug. 18, 2011, 2 pages.

IBM Rational Software Architect V7, http://www-01.ibm.com/software/awdtools/architecUswarchitect, 1 p., printed Jun. 24, 2011.

"IEEE Recommended Practice for Architectural Description of Software-Intensive Systems," IEEE, 2000, 29 pages.

"IEEE Recommended Practice for Software Requirements Specifications," IEEE, 1998, 39 pages.

Ilieva, M. G. et al., "Automatic Transition of Natural Language Software Requirements Specification into Formal Presentation," Natural Language and Processing Information Systems, Lecture Notes in Computer Science, vol. 3513, copyright Springer-Verlag, 2005, pp. 392-397.

Information Technology—Open Distributed Processing—Reference model: Architecture, International Standard, ISO/IEC 10746-3, 1st Ed. 1996, 68 pages.

Information technology—Open Distributed Processing—Reference model: Foundations ISO/IEC 10746-2, 1st Ed., 1996, 28 pages.

Jain, P. et al., "Automated Review of Natural Language Requirements Documents: Generating Useful Warnings with User-extensible Glossaries Driving a Simple State Machine," ISEC '09, ACM, 2009, pp. 37-45.

Jansen, A. et al., "Software Architecture as a Set of Architectural Design Decisions," Proceedings of the Fifth Working IEEE/IFIP Conference on Software Architecture, 2005, 10 pages.

Keshav, R. et al., "Towards a Taxonomy of Architecture Integration Strategies," the 3rd International Software Architecture Workshop, 1998, 4 pages.

Kleppe, A., *MDA Explained: The Model Driven Architecture: Practice and Promise*, Addison-Wesley, copyright 2003, 187 pages.

Kruchten, P., "An Ontology of Architectural Design Decisions in Software-Intensive Systems," 2004, 8 pages.

Kruchten, P., "Architectural Blueprints—The "4+1" View Model of Software Architecture," IEEE Software, vol. 12, No. 6, 1995, 15 pages.

Kruchten, P., *The Rational Unified Process: An Introduction*, 3rd ed. Object Technology Series. Addison-Wesley, copyright 2004, 320 pages.

Lami, G., "QuARS: A Tool for Analyzing Requirements," Software Engineering Measurement and Analysis Initiative, Technical Report, 2005, 46 pages.

Lau, K-K. et al., "A Taxonomy of Software Component Models," Proceedings of the 2005 31st EUROMICRO Conference on Software Engineering and Advanced Applications, IEEE, 2005, 8 pages.

Liu, a. et al., "Accelerating COTS Middleware Acquisition: The i-Mate Process," IEEE Software, 2003, pp. 72-79.

Liu, D. et al., "Natural Language Requirements Analysis and Class Model Generation Using UCDA," IEA/AIE, Springer-Verlag, 2004, pp. 295-304.

Maiden, N. A. et al., "Acquiring COTS Software Selection Requirements," IEEE Software, 1998, pp. 46-56.

Mattsson, A. et al., "Linking Model-Driven Development and Software Architecture: A Case Study," IEEE Transactions on Software Engineering, vol. 35, No. 1, 2009, pp. 83-93.

Mattsson, A. et al., "Modelling Architectural Design Rules in UML," Proceedings of EMMASD, 2008, pp. 71-79.

Medvidovic, N. et al., "A Classification and Comparison Framework for Software Architecture Description Languages," IEEE Transactions on Software Engineering, vol. 26, No. 1, 2000, pp. 70-93.

Mich, L. et al., "NL-OOPS: a Requirements Analysis Tool based on Natural Language Processing," Data Mining III, 2002, pp. 321-330.

Morisio, M. et al., "Definition and Classification of COTS: A Proposal," ICCBSS, Orlando, FL, 2002, 10 pages.

Overmyer, S.P. et al., "Conceptual modeling through linguistic analysis using L1DA," in Proceedings of the 23rd International Conference on Software Engineering, 2001, pp. 401-410.

Parmee, I. C., Ch. 11, "Towards Interactive Evolutionary Design Systems," Evolutionary and Adaptive Computing in Engineering Design, London: Springer-Verlag, 2001, pp. 205-231.

Pilone, D. et al., UML 2.0 in a Nutshell: A Desktop Quick Reference, O'Reilly, copyright 2005, 235 pages.

(56) References Cited

OTHER PUBLICATIONS

Robillard, P. N., "The Role of Knowledge in Software Development," Communications of the ACM, vol. 42, No. 1, 1999, pp. 87-92.

Sarkar, S. et al., Accelerating Technical Design of Business Applications—A Knowledge-Based Approach, India Software Engineering Conference 2010, ACM, 2010, pp. 43-50.

Sarkar, S. et al., "EAML—Architecture Modeling Language for Enterprise Applications," Proceedings of the IEEE International Conference on E-Commerce Technology for Dynamic E-Business, IEEE Computer Society, 2004, 8 pages.

Schmerl, B. et al., "AcmeStudio: Supporting Style-Centered Architecture Development," In Proc. 2004 International Conference on Software Engineering, Edinburgh, Scotland, 2004, 2 pages.

Schmidt, D., "Model-Driven Engineering," IEEE Computer Society, 2006, pp. 25-31.

Selic, B. "The Pragmatics of Model-Driven Development," IEEE Software, 2003, pp. 19-25.

Shahin, M. et al., "Improving Understandability of Architecture Design through Visualization of Architectural Design Decision," SHARK '10, ACM, 2010, 8 pages.

Sharma, V. S. et al., "Extracting High-Level Functional Design from Software Requirements," 2009 16th Asia-Pacific Software Engineering Conference, IEEE, 2009, pp. 35-42.

Simons, C. L. et al., "Interactive, Evolutionary Search in Upstream Object-oriented Class Design," IEEE Transactions on Software Engineering, 2010, pp. 1-20.

Simsion, G. C. et al., *Data Modeling Essentials*, 3rd Ed., Morgan Kaufmann, copyright 2005, 543 pages.

Skyway software, printed from the internet at <http://www.skywaysoftware.com/> on Aug. 22, 2011, 3 pages.

Steinberg, D. et al., *EMF: Eclipse Modeling Framework*, 2nd ed., Addison-Wesley, copyright 2009, 716 pages.

Svetinovic, D., et al., "Concept Identification in Object-Oriented Domain Analysis: Why Some Students Just Don't Get It," Proceedings of 13th IEEE Conference on Requirements Engineering, IEEE Computer Society, 2005, 10 pages.

The Protege Ontology Editor and Knowledge Acquisition System, printed from the internet at <http://protege.stanford.edu/> on Aug. 16, 2011, 2 pages.

Tolvanen, J-P. et al., "Defining Domain-Specific Modeling Languages to Automate Product Derivation: Collected Experiences," SPLC 2005, pp. 198-209.

Verma, K. et al., "Requirements Analysis Tool: A Tool for Automatically Analyzing Software Requirements Documents," ISWC 2008, Springer-Verlag, 2008, pp. 751-763.

Visual Studio, MSDN, printed from the internet at <http://msdn.microsoft.com/en-us/vstudio/default.aspx> on Jun. 24, 2011, 2 pages.

Whitehurst, D., *The AppFuse Primer*, SourceBeat, LLC, copyright 2008, 216 pages.

Zannier, C. et al., "A Model of Design Decision Making Based on Empirical Results of Interviews with Software Designers," Information and Software Technology, vol. 49, 2007, pp. 637-653.

Zimmermann, O. et al., "Managing Architectural Decision Models with Dependency Relations, Integrity Constraints, and Production Rules," 36 pages.

Baader, F., et al., "Description Logics"; Theoretical Computer Science; 40 pages; 2005; TU Dresden, Germany.

Brandozzi, M., et al., "Transforming Goal Oriented Requirement Specifications into Architecture Prescriptions", 8 pages; 2001; Center for Advanced Experimental Software Engineering Research at The University of Texas, Austin.

Mehta et al., "Towards a Taxonomy of Software Connectors"; 10 pages; 2000; ISCE '00—Proceedings of the $22^{nd}$ International Conference on Software Engineering.

Rech et al., "Intelligent Assistance in German Software Development: A Survey"; 9 pages; Jul.-Aug. 2007; Software, IEEE (vol. 24, Issue 4).

\* cited by examiner

| Req. Type | Requirement Text Structure | Candidate classes (CCs) | Relationships | Responsibilities | Attributes |
|---|---|---|---|---|---|
| SA | S="<JJ1>NP1 shall VB<JJ2>NP2 <IN><JJ3>NP3" | NP1, NP2, <NP3> | NP1 → <NP3>, NP2 | HSA1: If NP3 is not a Person NP3.{VB+<JJ2>+NP2}() HSA2: If NP3 is absent or a Person and NP1 is not a Person NP1.{VB+<JJ2>+NP2}() HSA3: If VB is missing or is "have" No responsibility. | NP1. JJ1, NP2. JJ2, <NP3. JJ3> |
| E | S="<JJ1>NP1 shall allow<JJ2>NP2 to VB<JJ3>NP3<IN><JJ4>NP4" . | NP1, NP2, NP3, <NP4> | NP1 → NP2, NP3, <NP4> | HE1: If NP3 is not a Person NP1.{VB+<JJ3>+NP3}() | NP1. JJ1, NP2. JJ2, NP3. JJ3, <NP4. JJ4> |
| | S="<JJ1>NP1 shall be able to VB <JJ2>NP2 IN<quantifier> <JJ3>NP3" | NP1, NP2, NP3 | NP1 → NP2, NP3 | HE2: If NP1 is not a Person NP1.{VB+<JJ2>+NP2}() | |
| P | S="<JJ1>NP1 is associated with <quantifier> <JJ2>NP2". | NP1, NP2 | NP1 ⟶ NP2 | No responsibility. | NP1. JJ1, <NP2. JJ2> |
| D | S="<JJ1>NP1 is <classified as>/<defined as> a <type of a> <JJ2> NP2." | NP1, NP2 | NP1 ⇢ NP2 | No responsibility. | NP1. JJ1, <NP2. JJ2> |

Where:
NP denotes a Noun Phrase   JJ denotes an adjective   → represents an Association relationship
VB denotes a verb   IN denotes a preposition   ⇢ represents a Generalization relationship
Italicized text represents the model phrase   "+" represents String concatenation

FIG.3

| Heuristics | Use Case Text Structure | Candidate classes | Responsibility and Assignment | Attributes |
|---|---|---|---|---|
| HUC1 HUC2 HUC3 | UC="<JJ1>NP1VB<JJ2>NP2 <IN<JJ3>NP3>". (Where: NP denotes a Noun Phrase VB denotes a verb JJ denotes an adjective IN denotes a preposition) | NP1, NP2, <NP3> (unless any of them is "System") | HUC1: If NP1 is "System" Responsibility: UCComponent.Controller.{VB+<JJ2>+NP2}() (where UC has been grouped as apart of UCComponent) HUC2: If NP1 is of type Person Responsibility: UCComponent.Boundary.{VB+<JJ2>+NP2}() (where UC has been grouped as apart of UCComponent) HUC3: If NP1 is not "System" or of type Person Responsibility: NP1.{VB+<JJ2>+NP2}() | NP1.JJ1, NP2.JJ2, <NP3.JJ3> (if any of them is "System", the attribute goes to the controller class) |

"+" represents String concatenation

FIG.4

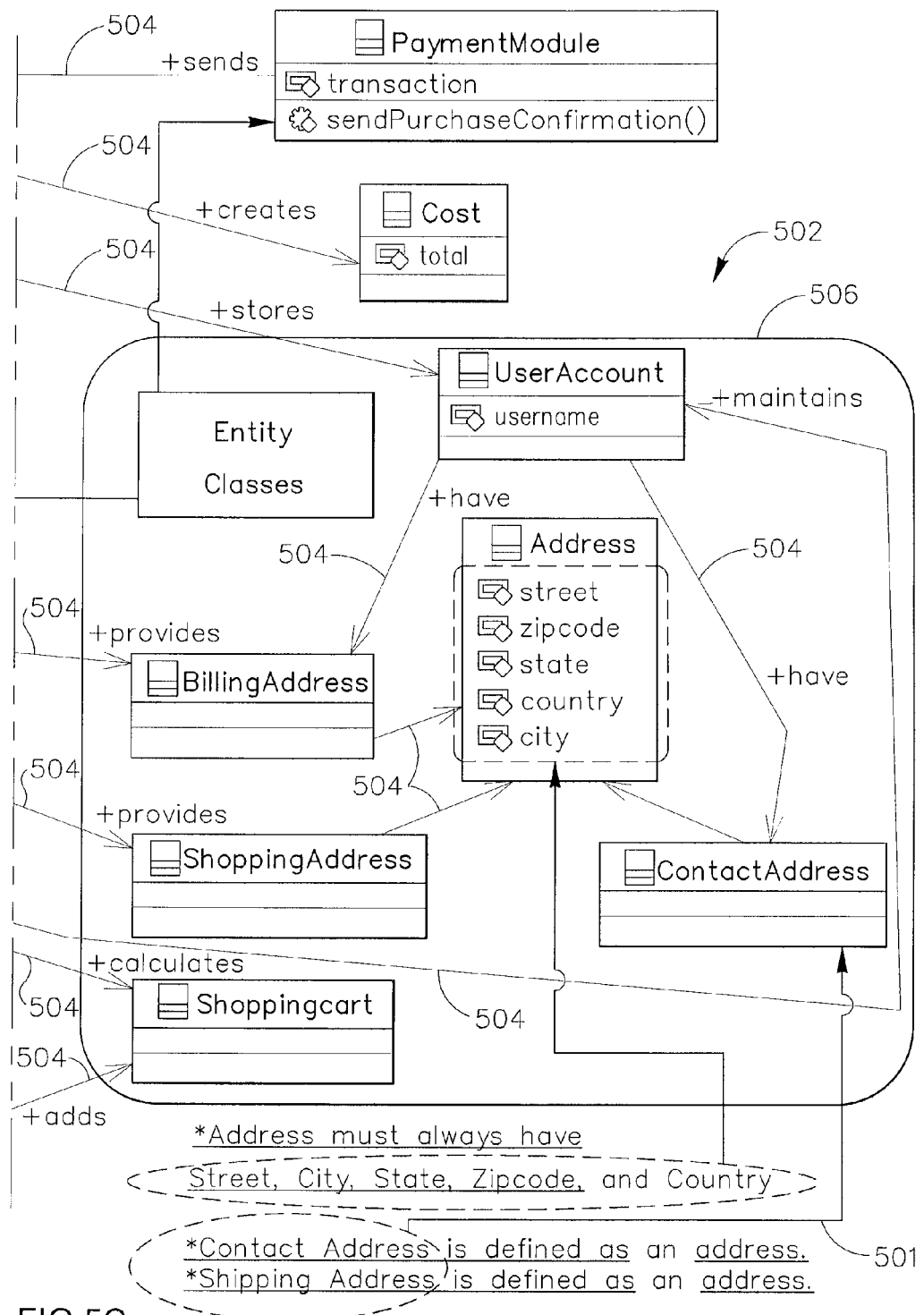
FIG.5C Requirements

ASSISTANT TOOL

PRIORITY CLAIM

This application claims the benefit of priority from Indian non-provisional patent application no. 237/CHE/2011 filed Jan. 25, 2011, which is incorporated by reference.

TECHNICAL FIELD

This present disclosure relates to generation of a formal design of a system based on a requirements specification, and more particularly, to generation of a formal design diagram for visual representation.

BACKGROUND

Design of systems, such as software systems, may begin with a diagram depicting operation of the system. Such diagrams may be based on a set of requirements that the system must perform in order to function as desired. The diagrams may be manually created through software tools requiring a system developer to generate a diagram through manual input based on each requirement statement present in a requirements specification.

SUMMARY

A design assistant tool may automatically generate a design diagram based representative of a system based on a processed requirements specification including a plurality of processed requirement statements and use cases. The design assistant tool may implement a functional design assistant module on a computer device. The functional design assistant module may apply heuristic rules to the processed requirement statements and/or the processed use cases to determine various components of a functional design. The functional design assistant module may also generate a functional design diagram using the various components.

The design assistant tool may implement a technical design assistant module on a computer device. The technical design assistant module may generate a technical design based on the functional design. The technical design assistant module may allow various aspects of the functional design to be modified, such as the introduction of design elements that may include the technical architecture style, technical capabilities and services, and off-the-shelf products that may be required to implement the system to create the technical design. The technical design assistance module may also generate a technical design diagram using these design elements.

Further objects and features of the present disclosure invention will be apparent from the following description, reference being made to the accompanying drawings wherein the preferred embodiments of the present disclosure are clearly shown.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 3 is an example set of requirement statement heuristic rules.

FIG. 4 is an example set of use case heuristic rules.

FIGS. 5A-5C is an example mapping of processed use cases and requirement statements to a functional design diagram.

DETAILED DESCRIPTION OF THE DRAWINGS

Figure 1:
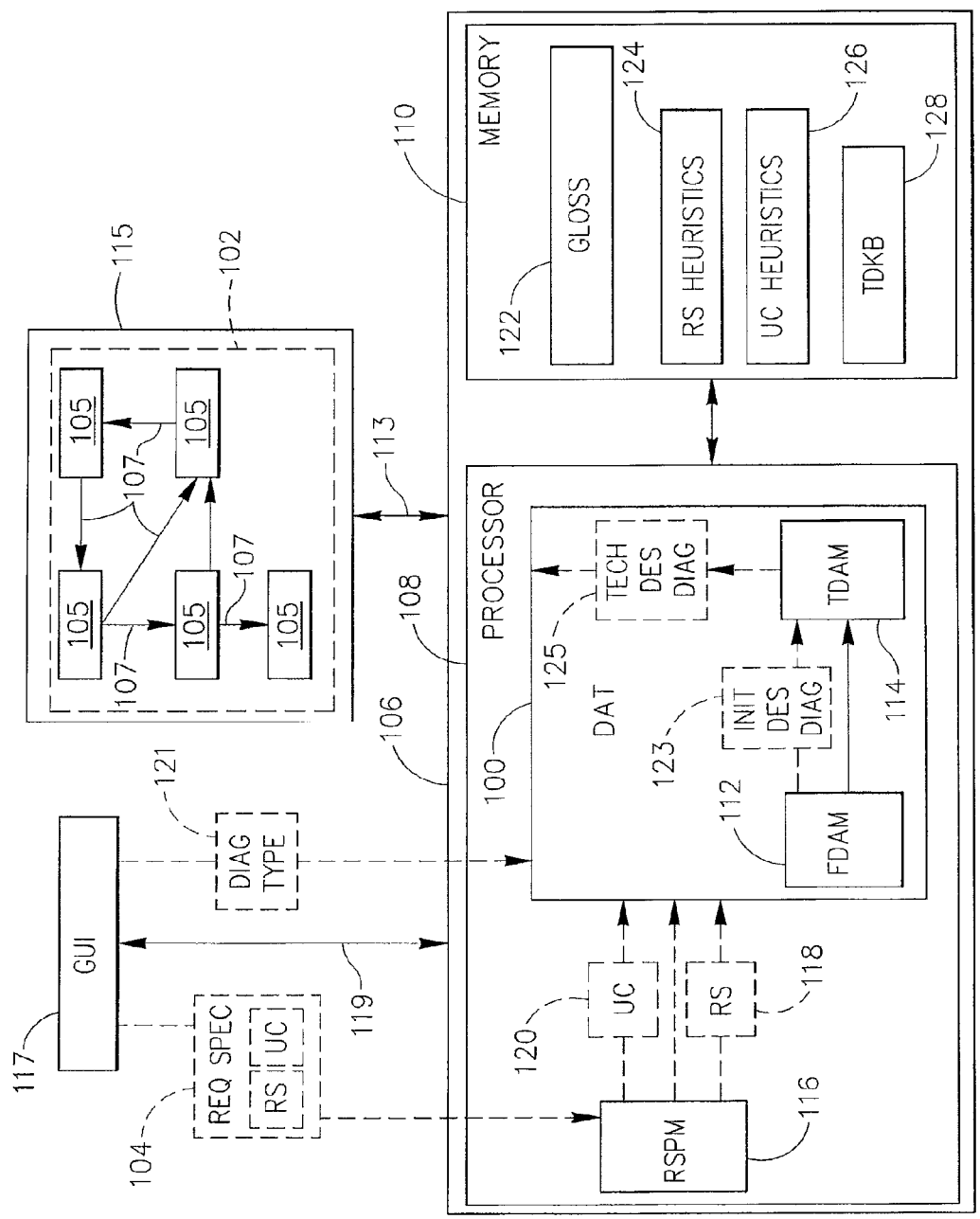
FIG. 1 is a block diagram of an example design assistant tool.

FIG. 1 is a block diagram of a design assistant tool (DAT) 100. The DAT 100 may automatically generate a displayed design diagram 102 based on a requirements specification 104 that may include textual requirement statements and use cases. The displayed design diagram 102 may be a functional design diagram and/or a technical design diagram, for example, that may provide a visual representation of a system, such as a software system, for example. The displayed design diagram 102 may include a plurality of design diagram components such as, for example, elements 105 and relationship indicators 107. The elements 105 may represent various aspects of a system to be described by the design diagram 101, and the relationship indicators 107 may indicate particular relationship types between the elements 105. In one example, the displayed design diagram 102 may be a class diagram used to represent structural aspects of a system design. Class diagrams may include a set of candidate classes that represent high level functional design elements 105. The classes may represent high level, coarse-grained functional system modules, as opposed to low level implementation classes. The displayed design diagram 102 may be another type of diagram such as an entity diagram, or any other diagram type capable of conveying a functional or technical design of a system. The displayed design diagram 102 may be based in Unified Modeling Language (UML), such as a UML class diagram or UML entity diagram.

A requirements specification 104 may refer to one or more documents containing a description of desired behavior and/or functionality of a system to be developed, such as, for example, a software system. The requirements specification 104 may include a set of functional requirements that may be individual statements or use cases that describe interactions that users may have with software described by the requirements specification 104. In addition, the requirements specification 104 may include nonfunctional requirements that may impose constraints on the design or implementation of the software developed from the requirements specification 104, such as, for example, performance engineering requirements, quality standards, or design constraints.

In one example, the requirements specification 104 may include a plurality of requirement statements (RS) and/or a plurality of use cases (UC). Each requirement statement may provide one or more particular aspect(s) with regard to overall software architecture as described by the requirements specification 104. Each use case may provide an example of use in the system to be represented by the design diagram 101. Use cases may include a use case name and one or more sentences, phrases, and/or statements describing aspects of the particular use case. Based on the content of the requirement statements and the use cases present in the requirements specification 104, a functional architecture of a software system described by the requirements specification 104 may be shown through the displayed design diagram 102. The displayed design diagram 101 may statically or dynamically represent a system.

In FIG. 1, the DAT 100 may be implemented by a computer device 106 having a processor 108 and a memory 110. The memory 110 may include one or more memories and may be non-transitory computer-readable storage media or memories, such as, for example, a cache, buffer, RAM, removable media, hard drive or other computer readable storage media. Computer readable storage media may include various types of volatile and nonvolatile storage media. Various processing techniques may be implemented by the processor 108 such as multiprocessing, multitasking, parallel processing and the like, for example. The processor 108 may include one or more processors. The DAT 100 may be implemented through various analysis and design tools such as, for example, Rational Software Architect (RSA) by IBM of Armonk, N.Y., or Microsoft Visio or Microsoft Visual Studio by Microsoft Corp. of Redmond, Wash. The DAT 100 may generate an output, such as the displayed design diagram 102, in environments such as these.

The DAT 100 may include a functional design assistant module (FDAM) 112 and a technical design assistant module (TDAM) 114. The term "module" may be defined to include a plurality of executable modules. As described herein, the modules are defined to include software, hardware or some combination thereof executable by the processor 108. Software modules may include instructions stored in the memory 110, or other memory device, that are executable by the processor 108 or other processor. Hardware modules may include various devices, components, circuits, gates, circuit boards, and the like that are executable, directed, and/or controlled for performance by the processor 108.

The displayed design diagram 102 may be transmitted from the computer device 106 to a display 115 in communication with the computer device 106. The displayed design diagram 102 may be transmitted to the display 115 through a connection 113. The connection 113 may represent a communication path between the display 115 and the computer device 106. The connection 113 may represent any suitable connection for communication such as direct connect, wireless, the Internet, or virtual private network, for example. The displayed design diagram 102 may also be transmitted to a plurality of displays similar to the display 115, such as CRT, plasma, LED, LCD displays or any other suitable display type.

In one example, the DAT 100 may generate the displayed design diagram 102 based on the requirements specification 104 having a predetermined format. In one example, the requirements specification 104 may be provided by a user via a graphical user interface (GUI) 117. The GUI 117 may be connected to the computer device 106 through a connection 119. The connection 119 may represent a communication path between the GUI 117 and the computer device 106. The connection 119 may represent any suitable connection for communication such as direct connect, wireless, the Internet, or virtual private network, for example. Diagram type input 121 may be received via the GUI 117 allowing a particular diagram type to be selected for generation, such as a UML class diagram or a UML entity diagram, for example. The GUI 117 and the display 115 may be the same device, cooperatively operating devices, or different separate devices.

The requirements specification 104 may be processed by a requirements specification processing module (RSPM) 116 executable by the processor 108. The RSPM 116 may process each requirement statement and use case in the requirements specification 104 separately, in parallel, or some combination. An output of the RSPM 116 may include processed requirements statements 118 that include each requirement statement individually processed for usage by the FDAM 112 as later described. An output of the RSPM 116 may also include processed use cases 120 that may include each use case individually processed for usage by the FDAM 112 as also later described. In one example, the RSPM 116 may be that described in United States Patent Application Pub. No. 2009/0138793, which is incorporated by reference herein in its entirety. However, various other techniques may be utilized to process the requirements specification 104, such as natural language processing techniques, predetermined requirement statements, or any other technique to properly process the requirements specification 104.

In one example, the FDAM 112 may generate a functional design diagram 123 that may be transmitted to the display 115 and may be the displayed design diagram 102. The functional design diagram 123 may also be received by the TDAM 114. The TDAM 114 may be implemented to generate a technical design diagram 125 through refinement and further development of the initial functional design diagram 123 to generate the displayed design diagram 102. In one example, both the FDAM 112 and the TDAM 114 may be configured to generate formal designs instead of the functional design diagram 123 and the technical design diagram 125, respectively. In such examples, a modeling tool implementing the DAT 100 such as the RSA, for example, may generate the functional design diagram 123 and the technical design diagram 125 based on the formal designs created by the DAT 100.

Upon receipt of the processed requirements statement 118, the FDAM 112 may access a plurality of glossaries 122, a requirements statement (RS) heuristics data set 124, and a use (UC) heuristics data set 126. The plurality of glossaries 122 may include terms and associated definitions and classifications. The glossaries 122 may be domain specific (e.g. banking, utilities, etc.) The terms may be present in the processed requirement statements 118 and processed use cases 120, as well as the requirements specification 104 allowing the FDAM 112 to identify the terms and associated definitions and classifications for generation of the displayed design diagram 102.

The requirement statement (RS) heuristics data set 124 may include a plurality of requirement-statement heuristic rules and may be accessed by the FDAM 112 in order to determine relationships and responsibilities between the identified terms in the processed requirements statements 118. In one example, the FDAM 112 may apply the RS heuristics data set 124 to the processed requirements statements 118 in order to generate components for the displayed design diagram 102. For example, the FDAM 112 may recognize particular relationships between entities based on the processed requirement statements 118. The FDAM 112 may generate particular elements 105 and relationship indicators 107 based on the glossary data sets 122 and the RS heuristics data set 124 to form components of the functional design diagram 123.

The use case (UC) heuristics data set 126 may include a plurality of use-case heuristic rules and may be accessed by the FDAM 112 in order to determine relationships and responsibilities between the identified terms in the processed use cases 120. The FDAM 112 may apply the use case heuristics data set 126 to the processed use cases 120 in order to generate components for the functional design diagram.

Figure 2:
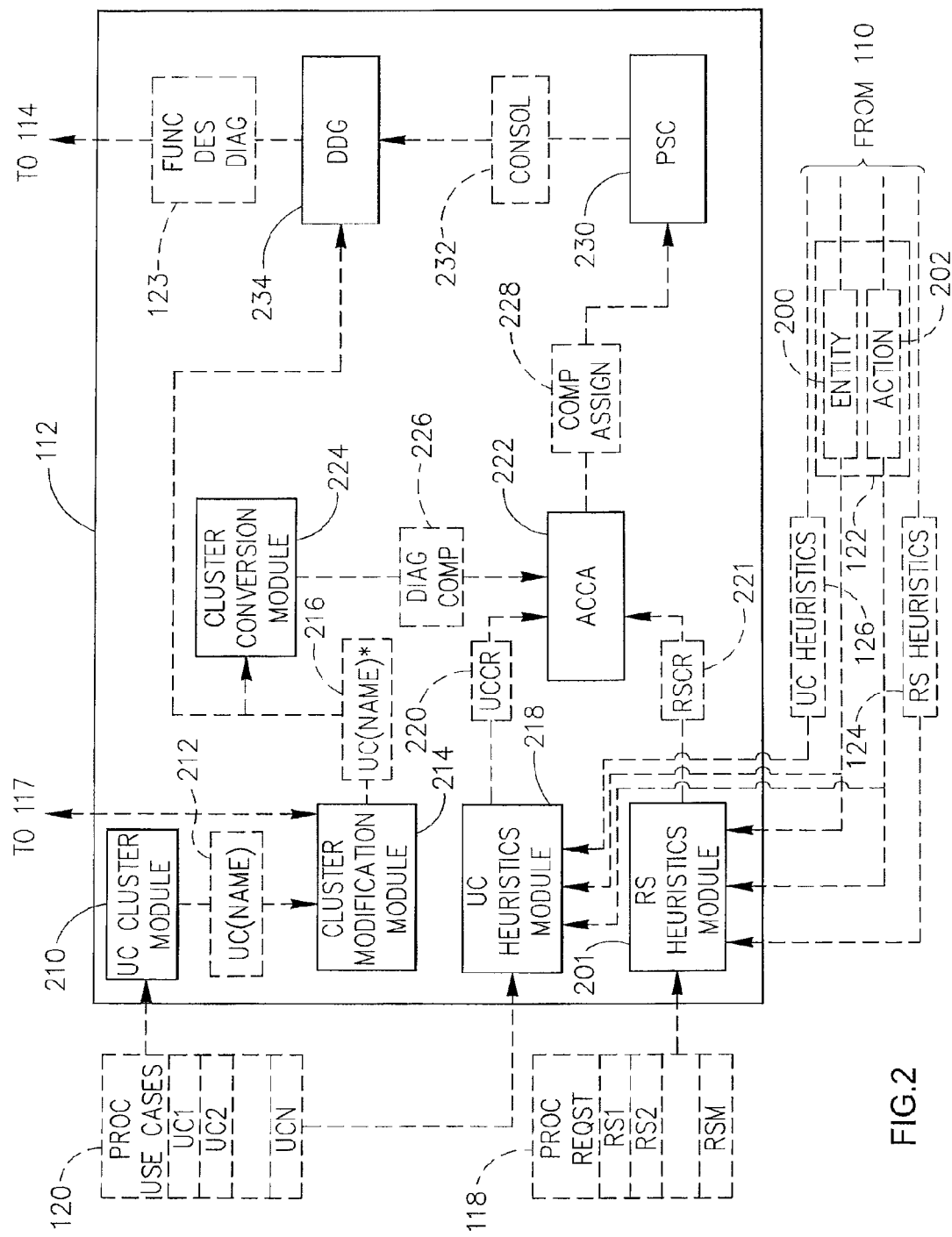
FIG. 2 is a block diagram of an example functional design assistant module.

FIG. 2 shows a block diagram of an example of the FDAM 112. In one example, the glossaries 122 may include an entity glossary 200 and an action glossary 202. The term "entity" refers to a thing that may be recognized as being capable of an independent existence and that can be uniquely identified, such as a physical object or a concept, for example. The entity glossary 200 may include various entities that include a software solution such as systems, sub-systems, interfaces, user processes, records, and data fields. The entity glossary 200 may also include entities that represent human users of such a systems like an employee or administrator, for example, that may be present in the requirements specification 104. In one example, an entity may be an agent, which may be defined as an entity that acts for a user or other system entity in a relationship of agency.

The entity glossary 200 may also be represented by a plurality of glossaries that may be organized according to particular qualities. For example, the entity glossary 200 may include specific entries for different agents. The action glossary 202 may include valid actions for performance that may be described by the requirements specification 104. In one example, an action may refer to any direct or indirect act performed by or on an entity in a system. The action glossary 202 may be made up of a plurality of actions according to particular action qualities.

In one example, the FDAM 112 may include a number of sub-modules such as a requirement statement (RS) heuristic module 201. The RS heuristic module 201 may receive the processed requirement statements 118 and apply one or more sets of heuristic rules to the processed requirement statements 118. In one example, the RS heuristic module 201 may retrieve one or more sets of RS heuristic rules.

In one example, the RSPM 116 may process each requirement statement in the requirements specification 104. In FIG. 2, each processed requirement statement (RS) 118 is designated as RS1 through RSM, where M may be the number of processed requirement statements. In one example, the RSPM 116 may access the glossaries 122 to identify entities and actions present in each requirement statement.

The RSPM 116 may also identify requirement types for each requirement statement. For example, the RSPM 116 may be configured to identify requirement types as illustrated in Table 1. Table 1 also provides a non-limiting definition and example for each requirement type listed.

TABLE 1

| Requirement Type | Definition |
| --- | --- |
| Solution Requirement (SA) | Describes what a proposed system (or component) shall do. |
| Enablement Requirement (E) | Implies what functionality a system or a component must provide. |
| Definition (D) | Describes an entity. |
| Policy (P) | Describes policies to be adhered to by the system. |

In one example, each processed requirement statement 118 may be deconstructed by the RSPM 116, such that entities, entity responsibilities, and requirement types may be identifiable for each processed requirement statement 118. For example, a requirement statement may be "The SAP System shall send vendor data to the order processing system." This statement may be identified as a solution requirement (SA) by the RSPM 116. The terms contained in the statement may be identified by the RSPM 116 as follows:

The SAP System: Agent, found in entity glossary;
shall: Modal phrase, found in action glossary;
send: Action phrase, found in action glossary;
vendor data: Entity, found in entity glossary; and
the order processing system: Agent, found in entity glossary.

Each processed requirement statement 118 may be individually processed in a similar fashion.

Each processed requirement statement 118 may be received by the RS heuristics module 201. In one example, the RS heuristics module 201 may be configured to recognize various elements from each of the processed require statements, such as different agents, action phrases, entity phrases, and requirement types. Upon identification of such elements, the RS heuristics module 201 may apply a set of heuristic rules retrieved from the RS heuristic rules data set 124. In one example, the heuristic rules applied may be heuristic rules 300 shown in FIG. 3.

The RS heuristics module 200 may apply the heuristics rules 300, as well as the glossaries 122 to the processed requirement statements 118 to determine candidate classes and methods that the candidate classes will contain. In one example, a candidate class may refer to a type of word, such as noun, that may be considered for eligibility as a class in a UML class diagram. In one example, a method of a candidate class may refer to a service or operation provided by a physical or conceptual object, such as a class.

Based on the identified text structure in each processed requirement statement 118, the RS heuristics module 201 may assemble element terms to be used in the functional design diagram 123, determine relationships of each element 105, and determine relationships between the elements 105. In FIG. 3, the heuristic rules 300 are shown for the requirement types of solution requirement (SA), enablement (E), policy (P), and definition (D). The RS heuristics rules 300 for the solution requirement according to the required text structure of a processed requirement statement 118 may include candidate classes of a first noun phrase "NP1," second noun phrase "NP2," a third noun phrase "NP3," and so on. The relationship may be one of association between the first noun phrase NP1 and both the second noun phrase NP2 and the third noun phrase NP3. The noun phrases NP1 through NP3, adjectives JJ1 through JJ3, and verb phrase VB may be recognized by the RS heuristic module 201 through use of the glossaries 122. Responsibility names associated with candidate classes may be generated based on application of the heuristic rules. Determination that a processed requirement statement 118 results in an associated responsibility may depend on the modal phrase, as well as the types of noun phrases and verbs present in the processed requirement statement 118. For example, the first heuristic HSA1 may be applied for a solution requirement if the processed requirement statement 118 has the solution requirement text structure shown in FIG. 3 and the third noun phrase "NP3" is not a person. The second heuristic HSA2 may be applied if the third noun phrase NP3 is absent from the solution requirement statement or is a person and NP1 is not a person. The third heuristic HSA3 may be applied if the verb phrase VB is missing or is the verb "have". Attributes of candidate classes may be generated based on the presence of adjectives in each processed requirement statement 118.

As shown in FIG. 3, RS heuristic rules 300 may be applied for each requirement type category. For example, a processed requirement statement 118 may provide "Contact Address is defined as an address." In this example, the modal phrase "is defined as" indicates that the processed requirement statement 118 is a definition type requirement statement. Based on the RS heuristic rules 300, "Contact Address" may be identified as a first noun phrase NP1 and "Address" as a second noun phrase NP2. Accordingly, "Contact Address" and "Address" are identified as candidate classes and a generalization relationship from "Contact Address" to "Address" may exist. No adjectives are present in the example processed requirement statement 118 so no attributes are identified.

The FDAM 112 may process uses cases prior to applying use case heuristic rules. Each use case may have a particular name along with multiple use case sentences describing the use case. Typical use cases may provide a set of actors, such as human beings, and one or more "systems" that may describe a component of a system that is used to interact with the actors. Due to the detailed nature of most use cases, typically more than one use case may be described for each constituent functional block of the system. In one example, use cases may be processed in an attempt to utilize the detailed interactions described by use cases in order to extract different candidate classes, both entity and processing, as well as related responsibilities and attributes of the candidate classes. In one example, the FDAM 112 may leverage the fact that many use cases describe different aspects of a single high-level functional block of the system and may use clustering to identify system components. The RSPM 116 may process each use case in the requirements specification 104. In FIG. 2, each processed use case (UC) 120 is designated as UC1 through UCN, where N may be the number of processed requirement statements. In one example, the RSPM 116 may access the glossaries 122, such as glossaries 200 and 202, to identify entities and actions present in each use case being processed.

In one example, the FDAM 112 may include a use case (UC) cluster module 210 configured to receive each processed use case 120. The UC cluster module 210 may perform clustering into components of the system based on parameters included in the use cases, such as the use case names. In one example, the UC cluster module 210 may implement a clustering function based on the first noun phrase of the use case name to cluster different use cases. Clustering in this manner allows use cases having commonality in their names to be commonly clustered with one another. In one example, the UC cluster module 210 may be based on use case names describing the activity that a particular system module may perform. In some use cases, the first noun phrase in a particular use case name may represent the conceptual entities in the system the particular use case explains the workings of. For example, Table 2 includes a clustering function that may be implemented by the UC clustering module 210 in order to cluster use cases.

TABLE 2

Initialize compSet ← Ø
for all usecase $uc_i$ do
    ucname ← getUsecaseName($uc_i$)
    clusteringNoun ← getFirstNount(ucname)
    matchSet ← {c ∈ compset|strSimilarity(c.name,clusteringNoun) ≥ τ}
    {τ is user - defined threhold}
    if matchSet ≠ Ø then
    Get the comp ∈
matchSet whose strSimilarity(comp.name,clusteringNoun) is maximum.
    Add $uc_i$ to comp.list
    else
        Create a new component comp and add it to compSet
        comp.name ← clusteringNoun
    Add $uc_i$ to comp.list TABLE 2-continued end if
end for In Table 2, the clustering function may parse through each name of a processed use case 120 to get the first noun phrase contained in the processed use case 120. If a component with the same name already exists, as identified by the UC cluster module 210, a list ("comp.list") is updated for the particular component. If a component with the same name does not exist, a new component is created and a list for the new component is created. In one example, the UC cluster module 210 may generate a clustered use case (UC) data set 212. The clustered UC data set 212 may include the clustered uses cases as a function of use case names as previously described and designated as UC(name) in FIG. 2. The clustered use cases may be available via the GUI 117 allowing a user to modify the clustered use cases included in the clustered UC data set 212 in the manner desired through a cluster modification module 214. The cluster modification module 214 may generate a modified clustered UC data set ("UC(name)*") 216. If no modifications are made, the modified clustered UC data set 216 may be identical to the clustered UC data set 212.

When processing use case sentences, the FDAM 112 may restrict each acceptable use case sentence to have a simple structure, such as a noun phrase NP1 followed by a verb followed by a second noun phrase NP2 and optionally a preposition following another noun phrase NP3. All noun phrases may be optionally preceded by an adjective JJ. Based on this structure, a set of use case (UC) heuristic rules may be defined to process use case sentences. A use case (UC) heuristic module 218 may apply the UC heuristic rules retrieved from the UC heuristic data set 126. In one example, the UC heuristic rules may be the UC heuristic rules 400 shown in FIG. 4. The UC heuristic module 218 may also retrieve the glossaries 122 to be used in application of the heuristic rules 400.

Through application of the UC heuristic rules 400 by the UC heuristic module 218, each component identified by the UC cluster module 210 may be assigned a default processing class termed a "controller" by the UC heuristic module 218. A controller may represent the "system" to which the use case steps refer. In one example, the responsibility may be assigned by the UC heuristic module 218 to the first noun phrase NP1 identified as a candidate class in the system. The three noun phrases NP1 through NP3 may be extracted as candidate classes and the adjectives, if any, may be chosen as attributes of the corresponding candidate class from each sentence of each processed use case 120. The verb or verb phrase VB and following second noun phrase NP2 is indicative of the responsibility to which each processed use case 120 refers. According to the first UC heuristic rule HUC1, the responsibility is assigned to the first candidate class referred by the first noun phrase NP1 or if the first noun phrase NP1 is the "system." Based on the second UC heuristic rule HUC2, if the first noun phrase NP1 is a person, which may imply that the use case statement represents an action done by a system user, a responsibility is assigned to special processing class termed "boundary" with the component. This may denote that the responsibility is arising out of direct interaction with system user.

For example, a statement included in a processed use case 120 may provide "System sends credit card information to the Payment module." In this example, the candidate classes may be the noun phrases "credit card information" and "payment module." The noun phrase NP1 in this example is "system,"

which may be considered a generic term and hence not added as defined in the heuristic rules 400. The term for the verb phrase and second noun phrase (VB+NP2) is "sends credit card information" and because NP1 is "system," the responsibility of sending credit card information is assigned to the controller class of the example processed use case's parent component.

The UC heuristic module 218 may generate a use case class and responsibility (UCCR) data set 220. The UCCR data set 220 may include the identified analysis classes with responsibilities associated with the processed use cases 120. Similarly, the RS heuristics module 201 may generate a requirement statement class and responsibility (RSCR) data set 221 based on application of the RS heuristic rules 300 to the processed requirement statements 118. Both the RSCR data set 221 and the UCCR data set 220 may be received by an analysis class component assignment (ACCA) module 222. A cluster conversion module 224 may receive the modified clustered UC data set ("UC(name)*") 216. The cluster conversion module 224 may convert each cluster into a design diagram component, such as a UML component. In one example, a platform used, such as the RSA tool may exposes various APIs to create UML elements, and diagrams programmatically. Since the DAT 100 may be implemented as a plugin to RSA, the FDAM 112 may use these APIs. The cluster conversion module 224 may implement a UML component creation API to create a UML component for a cluster. Other platforms, such as Visual Studio or ArgoUML, for example, may be similarly implemented. The cluster conversion module 224 may generate a diagram component data set 226 that is also received by the ACCA module 220.

Upon receipt of the UCCR data set 220, RSCR data set 221, and the diagram, component data set 226, the ACCA module 222 may assign candidate classes identified in the processed use cases 120 to the identified components of the functional design diagram 123. In one example, when evaluating the processed use cases 120, the UC cluster module 210 may determine how related a processing class is to the parent component of the use case. The UC cluster module 210 may generate a component affinity count for each use case parent component. The component affinity count may be incremented for each addition of a responsibility to the respective candidate class. As processing by the UC heuristics module 218 proceeds, the component affinity count for each processing class will be highest for a component in the corresponding use cases that is referenced the most. Once all counts are performed, the processing classes are assigned to the component for which it has the highest affinity count. In one example, the UC heuristics module may use an affinity scheme shown in Table 3 to determine the various component affinity counts. The component affinity counts may be included in the UCCR data set 220.

TABLE 3

```
for all usecase uc_i do
    Let comp_n be the component such that uc_i ∈ comp_n.list
    Parse each Statement and apply Use Case heuristics
    for all Candidate Class CC_x found do
        for all responsibiity addition to CC_x do
            Affinity(CC_x, comp_n) = Affinity(CC_x, comp_n) + 1
        end for
    end for
end for
for all Candidate Class CC_x: do
    Find Component Comp_k for Affinity(CC_x, comp_k)is maximum
    Assign CC_x as a class of comp_k
end for
```

The ACCA module 226 may generate a component assignment data set 228 containing the determined components and relationships of the functional design diagram 123. The component assignment data set 228 may be received by a processing step consolidation (PSC) module 230. In some instances, candidate classes identified by the RS heuristics module 201 and the UC heuristics module 218 may overlap. In one example, the PSC module 230 may determine of candidate classes identified in the processed use cases 218 by the UC heuristics module 218 are present in those identified by the RS heuristics module 200. If so, the responsibilities and attributes identified for a particular candidate class by the RS heuristics module 200 may be appended to those candidate classes as identified by the UC heuristics module 218. If not, the class may be designated as unclassified or as an entity class.

Classes not involved in any processing steps may be candidates for representing data or human interaction with a system. Thus, identified classes having no responsibilities may be designated as entity classes. The remaining classes may be assigned to a default component that may be subsequently manipulated by a user.

The entity classes may be further refined to determine those that would typically be attributes of other entity classes. Specifically, if an entity class does not have any attributes of its own and has an associative in-degree of one only with another (e.g., it is associated to only one) entity class, it becomes a candidate for being an attribute of that entity class. Intuitively, such a class may be used by only one other class, and because it does not have any responsibilities or attributes on its own, it is safe to say that the class acts as a data member exclusively used by the other class and does not have another function in the system. Thus, it may be better to make the class an attribute of the other class to simplify the system design.

A consolidation data set 232 may be generated by the PSC module 230. The consolidation data set 232 may be received by a design diagram generator (DDG) module 234. The DDG module 234 may also receive the modified cluster data set 216 from the cluster conversion module 224. The DDG module 234 may generate the initial functional design diagram 123 based on the modified cluster data set 216 and the consolidation data set 232. In one example, the functional design diagram 123 may be a UML diagram.

Figure 5A:
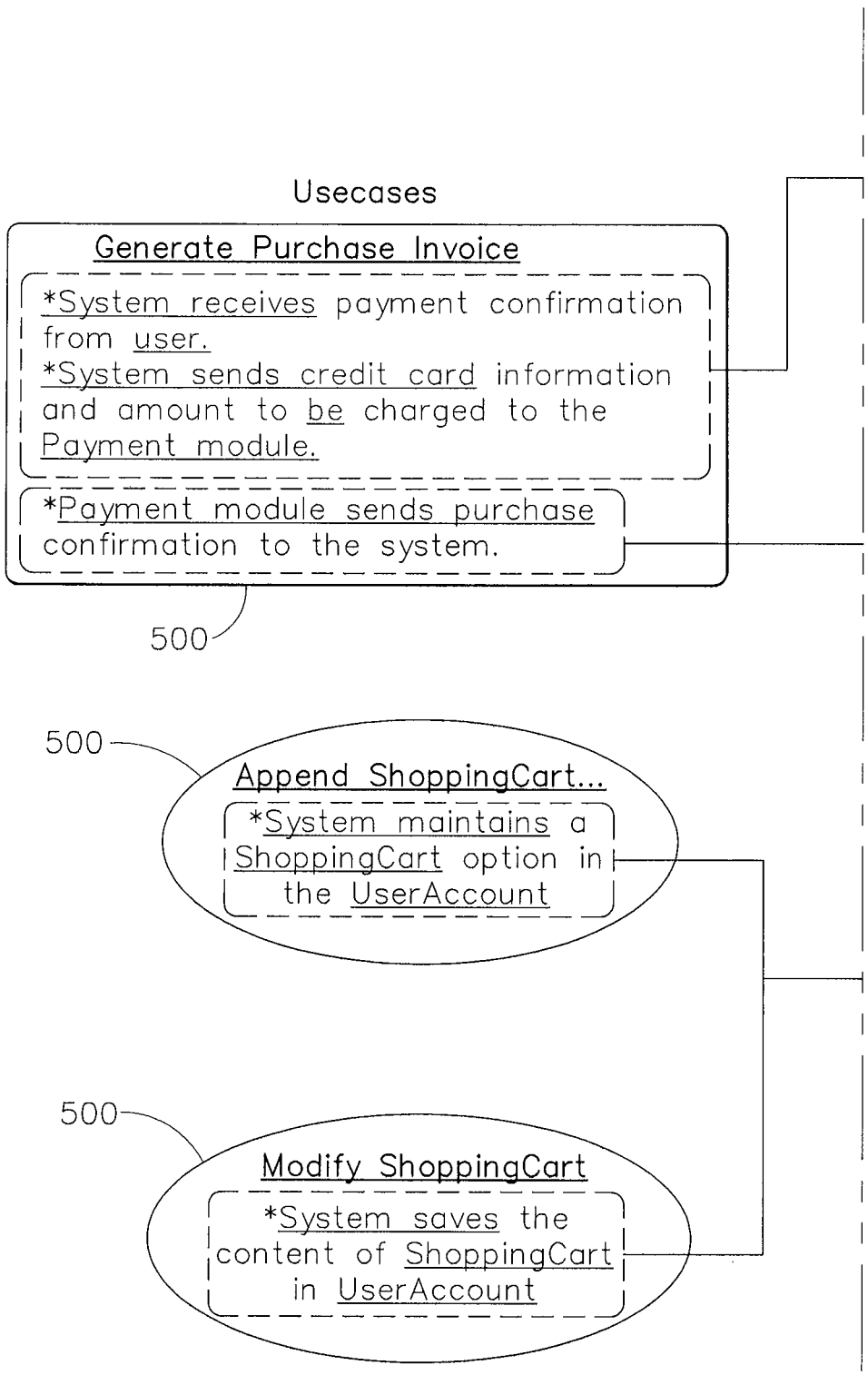
Figure 5B:
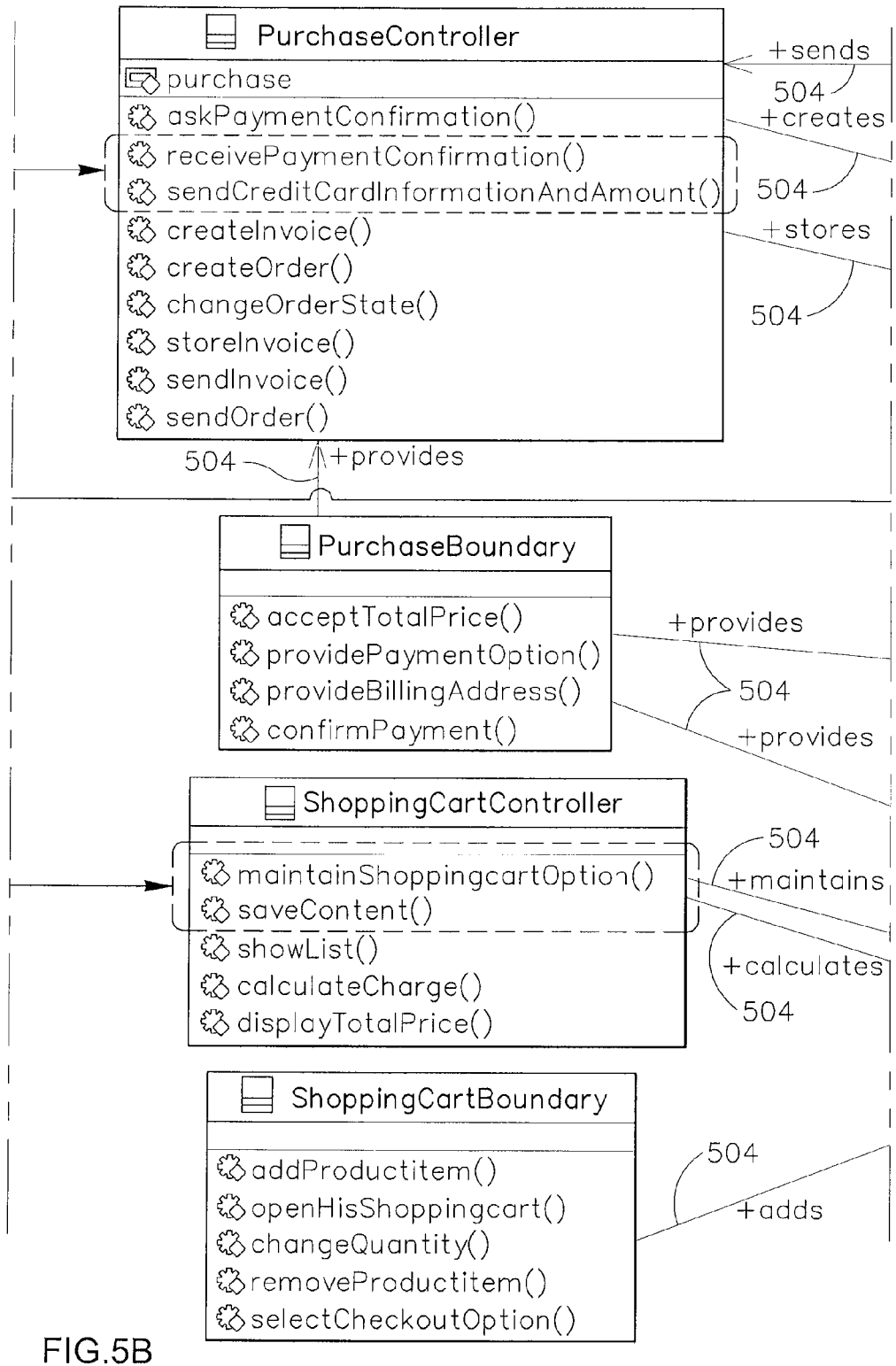

For purposes of illustration, FIGS. 5A-5C show example processed use cases 500 and processed requirement statements 501 and how the particular language maps to a portion of a UML diagram 502 through use of the FDAM 112. In FIGS. 5A-5C, the relationships 504 are generated based on the processed use cases 500 as are the entity classes 506.

Technical design of a system may provide an implementation and runtime perspective of the system. This may describe how functional components are implemented using hardware and software infrastructure. A technical design diagram is the pictorial representation of the technical design, which may be represented through a UML diagram or other suitable diagram. A technical design creation involves a series of design decisions, influenced by the cost and the availability of infrastructure components. Here the importance of software infrastructure selection and the interaction of software infrastructure components with the functional modules may be given strong consideration. Unlike the functional design where business experts are involved, technical design decisions are taken by a technical architect.

In one example, the technical design begins with the selection of one or more appropriate architecture styles, such as "pipe and filter", a web based "three tier" style, a "hub-spoke" style and so on. Subsequently, a system architect may choose a set of technical capabilities that are relevant to the style and are necessary to satisfy various non-functional requirements. Selection of appropriate capabilities is often non-trivial. For instance, consider a simple "pipe and filter" style for processing a stream of data through various stages. Here the system architect may decide to use a data buffering capability, a data transmission capability from one stage to another or a data transformation capability.

Based on such considerations, referring back to FIG. 1, the TDAM 114 may implement user input to convert the functional design diagram 123 into the technical design diagram 125. In performing the conversion, the TDAM module 114 may implement a knowledge base allowing design choices to be presented to a user. The design choices may be focused by the knowledge base and made available to a user. In one example, the knowledge base may be based on an ontology-based ontology model, such as an OWL-DL based ontology. In other examples, any other knowledge base tool, system, or model may be used.

Figure 6:
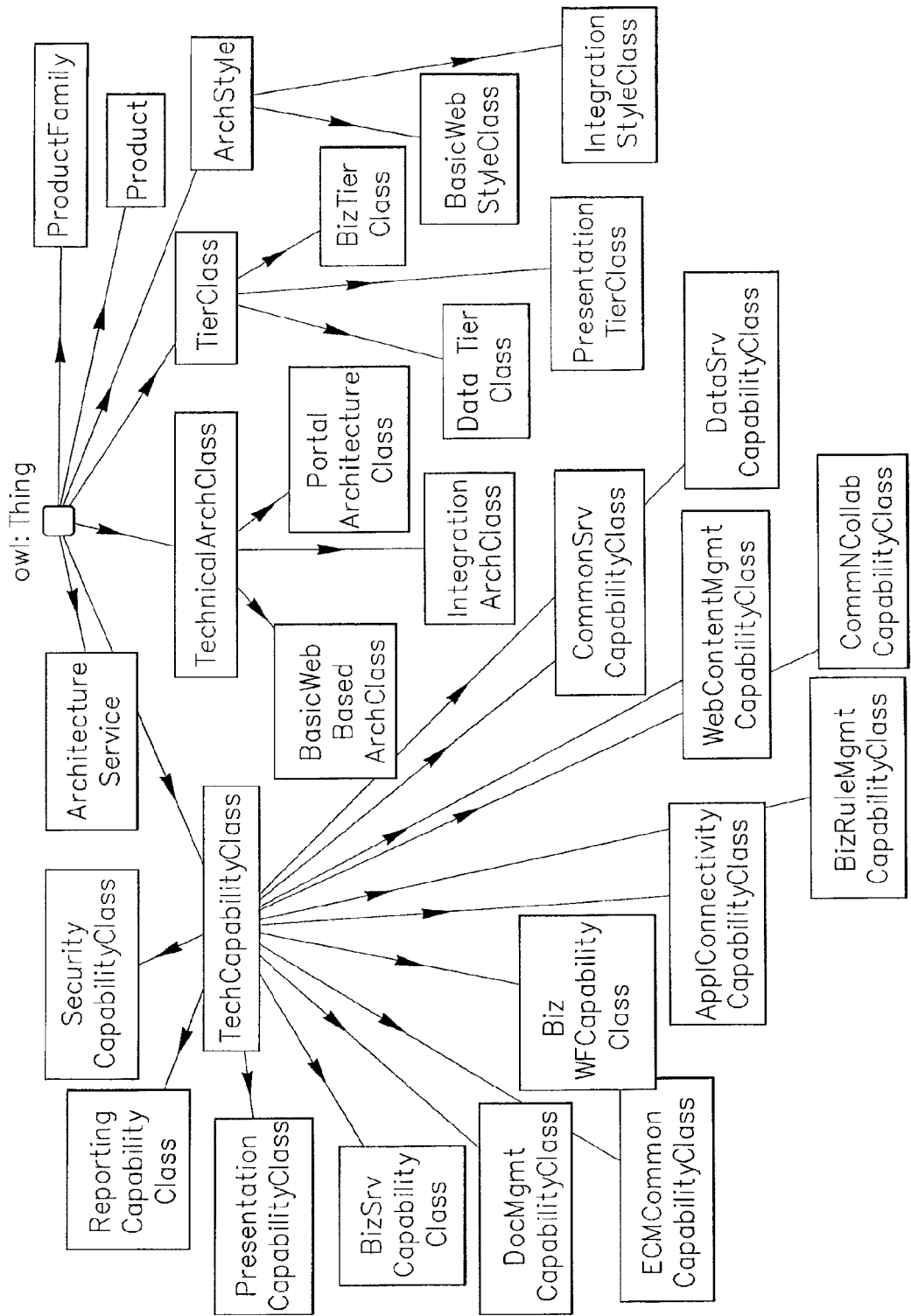
FIG. 6 is an example partial concept hierarchy of the technical design concept elements.

In one example, an ontology model may be stored on the memory device 110 in a technical design knowledge base (TDKB) data set 128 (see FIG. 1) that may be retrieved and implemented by the TDAM 114. The ontology model may include a set of technical design concepts $N_C$, the respective properties, and relationships $N_R$. The TDKB data set 128 may also include a set of terminological components (TBox) axioms T and a set of ground facts A that represent technical design instances. FIG. 6 shows a partial concept hierarchy of the technical design concept elements.

In one example, key concepts of a system design may be used to provide choices to a user allowing modification of the functional design diagram 123. For example, design of a particular system may begin with decisions regarding the nature of implementation. For instance, a web-based application, sophisticated web-portal, or traditional batch-type application may be implemented. This level of the design may be referred to as the technical architecture class, shown as "TechnicalArchClass" in the example of FIG. 6. This class may have several sub-classes. In one example, the technical architecture class may include subclasses dedicated to web-based applications (BasicWebBasedArchClass), web-portals (PortalArchClass), and an integration class (IntegrationArchClass) representing a combination of the other sub-classes. Allowing a user to manipulate the functional design diagram 123 at this level allows an entry point to the design process of a particular system.

The TDAM 114 may also allow a desired architecture style (ArchStyle in FIG. 6) to be manipulated in the functional design diagram 123. In one example, this concept may refer to a set of formal design rules that allow certain types of system components and connectors to be used in modeling the system and define assembly of the components and connectors. As shown in FIG. 6, in a web-based system, the architecture style may include several sub-classes, such as basic web style class (BasicWebStyleClass) and integration style class (IntegrationStyleClass). The basic web style class will be elaborated on further herein as an example. However, any sub-class may be similarly instructional.

The TDAM 114 may also allow a desired tier arrangement to be manipulated in the design diagram. In one example, a tier may refer to a particular tier of a multi-tier architecture. The tier concept is not limited to any particular architecture style, such as web-based. In FIG. 6 three sub-classes of tier are shown, which are presentation tier class (PresentationTierClass), business tier class (BizTierClass), and data tier class (DataTierClass) that may represent a presentation or user interaction tier, business logic tier, and database access tier, respectively.

The TDAM 114 may also allow an application stereotype to be manipulated in the functional design diagram 123. In one example, an application stereotype may be used to specify the intent or purpose behind a design element. The FDAM 112 may identify a boundary or entity (see FIGS. 3 and 4), where stereotypes may indicate that a class is meant for user interaction or data persistence, respectively. These stereotypes may assist in modeling various design decisions in the technical design. For example, in an n-Tier architecture, entity classes should be placed in the data access tier. To capture such a design decision, an ontology concept of application stereotype (AppStereotype) may be implemented. As discussed further (see FIG. 7), this concept may be implemented by the TDAM 114.

The TDAM 114 may also allow technical capability to be manipulated in the functional design diagram 123. In one example, the technical capability may represent a non-functional, architectural capability required by a functional model. FIG. 6 shows several, non-limiting capabilities of sub-classes of the technical capability class (TechCapabilityClass). For example, in FIG. 6, a security capability class (SecurityCapabilityClass) and data access related capability (DataSrvCapabilityClass) may be non-limiting sub-classes. These sub-class capabilities may be further broken down to provide lower-level description for a particular system.

The TDAM 114 may also allow manipulation of architecture service in the functional design diagram 123. In one example, the architecture service may provide a lower-level of granularity compared to technical capability. The architecture service (ArchitectureService) of FIG. 6 may include various sub-classes (not shown) that may be defined through multiple uses of the DAT 100. The TDAM 114 may also allow operations (Operation) represented by the functional design diagram 123 to be manipulated. Operations may refer to a service modeled by architectural services (ArchService) of a set of cohesive operations that are similar in purpose. In one example, an operation may represent an application programming interface (API) that a functional module can invoke.

The TDAM 114 may also allow particular commercial-off-the-shelf (COTS) products to be represented and manipulated in the functional design diagram 123. During system design, high-level decisions are typically made regarding a family of products that may be used to build a particular system or application. A family of products may be defined in a number of ways. One manner is to start from a particular product vendor such as IBM, Microsoft, or Oracle, or open source products or some combination. The concept of a product (Product) may represent a COTS component that implements a one or more technical functionalities. In some business applications, COTS components may play an important role during design and implementation. In the technical 1 design diagram 125, the notion of a product may be able to provide variability in a product range. In one example, a set of attributes of the Product concept may be implemented.

Figure 7:
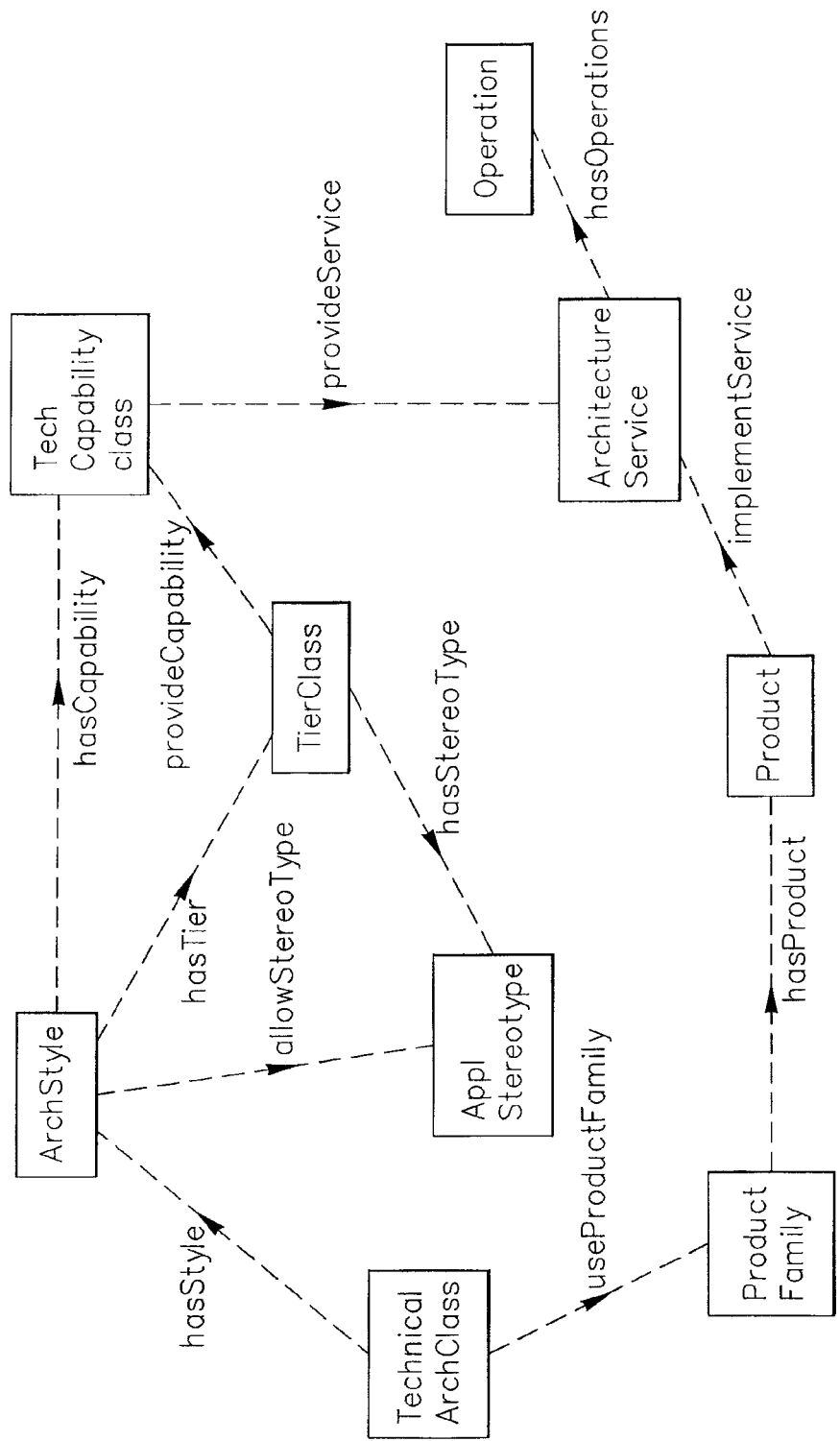
FIG. 7 is an example relationship graph 5.

The TDKB data 128 set may include relationships among these concepts and restrictions on the relationships. FIG. 7 shows a relationship graph indicating such relationships. In FIG. 7, the "hasStyle" relationship relates technical architecture class with architecture style. Through this relationship, a technical architecture class can be associated with one or more architectures styles. The relationship may be inherited by the sub-classes of technical architecture class. However, an additional restriction on this relationship for the sub-classes basic web architecture class and technical architecture class may be defined. For example, basic architecture style may be restricted to have only one architecture style, namely basic web style. The "hasTier" relationship relates an architecture style (ArchStyle) with one or more Tier concepts. In one example, for the basic webstyle class, the style may have only three tiers, such as the presentation tier (PresentationTierClass), business tier (BizTierClass), and a data tier.

The application stereotype concept may be related to the architecture style (ArchStyle), as well as the tier concept. If a stereotype, such as a boundary, is associated with a particular tier, such as the presentation tier, this may imply that that the component present in this tier is meant to perform the task implied by the boundary concept. The "hasStereotype" relationship is inverse functional in that a tier may have multiple stereotypes but a stereotype can be associated with only one tier.

The architecture style (ArchStyle) concept is related to one or more technical capability (TechCapability) concepts through the "hasCapability" relationship. A technical capability in turn may include a set of architecture service concepts defined by the hasService relationship. The "hasOperations" relationship relates architecture service with operations. Through this relationship, the multiple operations that architecture service may include may be modeled. The relationship "hasCapability" is generic and broad. These relationships may be restricted for individual subclasses. For example, basic web style class may be restricted to a few technical capability concepts.

The technical architecture concept may be related to one or more product family concepts as shown in FIG. 7. A product may provide an implementation of various technical capabilities and services. To model these characteristics, the relationship "implementsArchService" may be used.

Figure 8:
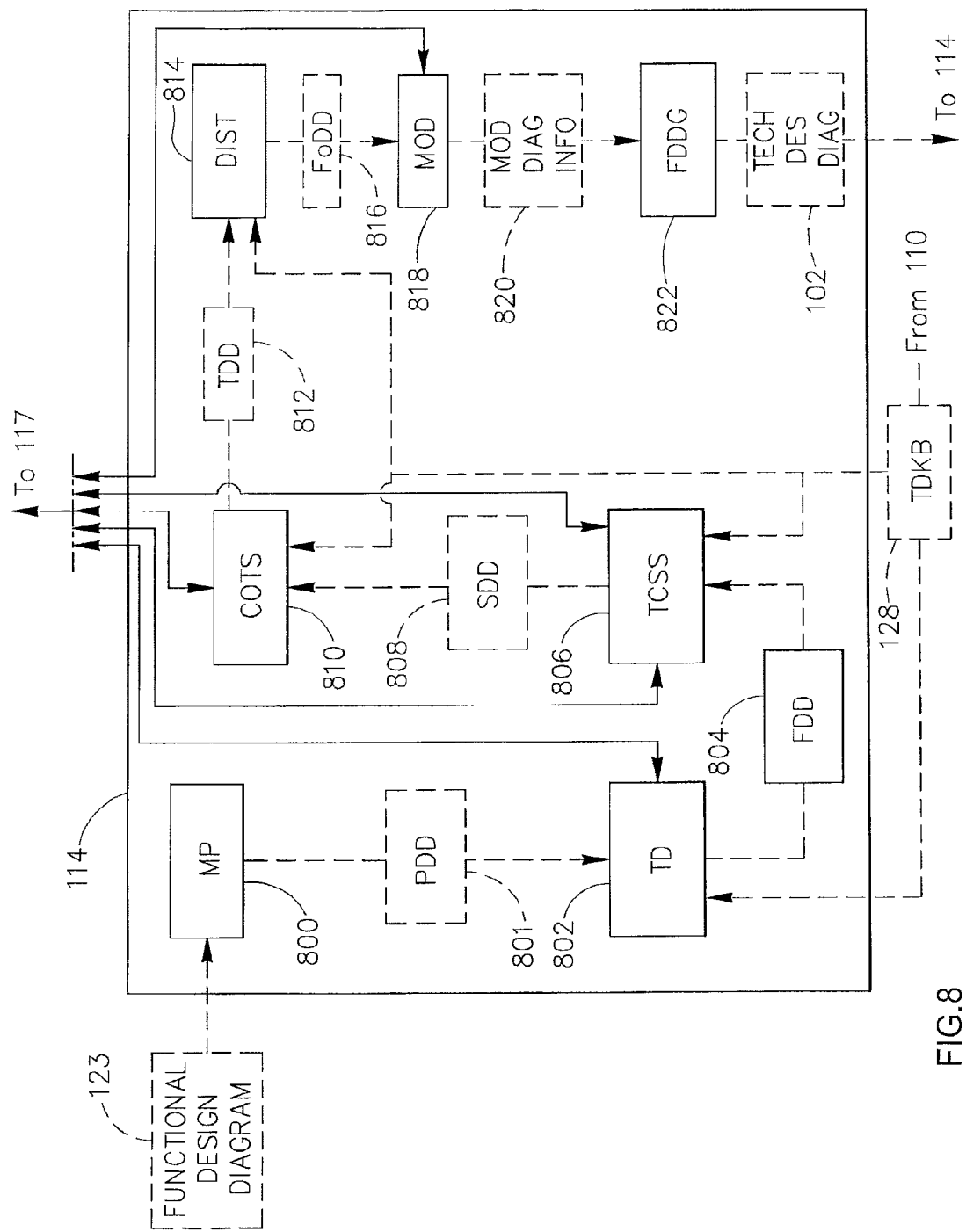
FIG. 8 is a block diagram of an example technical design assistant module.

The information may be generated through creation of instances using the concepts and the various relationships may be used to expand the information in the TDKB data set 128. Based upon this TDA knowledge base, the TDAM 112 may receive the functional design diagram 123 from the DAT. As shown in FIG. 8, the TDAM 112 may include a model processing (MP) module 800 that may interpret and determine the components of the functional design diagram 123 generated by the FDAM 112 and generate a processed design diagram (PDD) data set 801 containing the processed functional design diagram 123. In one example, the TDAM 114 may be configured to assist during a series of design decisions regarding generation of the technical design diagram 125 based on the functional design diagram 123.

In one example, the TDAM 114 may include a technical design (TD) module 802. The TD module 802 may receive the PDD data set 801 and allow selection through the GUI 117 of an appropriate technical architecture instance and a particular stereotype associated with it. For example, upon selection of technical architecture instance, such as basic web based architecture, the TD module 802 may retrieve "hasStyle(BasicWebBasedArchitecture)", which may refer to the set of all architectural style instances related to the basic web based architecture instances for selection. Upon selection, the TD module 802 may generate a first design decision (FDD) data set 804 that may also include the functional design diagram 123.

A technical capability and services selection (TCSS) module 806 may receive the FDD data set 804. The TCSS module 806 may assist in selection of an appropriate architecture service pertaining to the chosen style. In one example, the TCSS module 806 may retrieve the TDKB data set 128. The TCSS module 806 may allow selection of an appropriate architecture service pertaining to the style selected using the TD module 802. The TCSS module 806 may retrieve all instances of the architecture style related to the tier class, and for each tier, each capabilities for each architecture style instances related to each tier. In one example, the TCSS module 806 may retrieve all instances of "provideCapability" for each tier and allow all capabilities having the relationship "hasCapability" with the selected style. In this manner, the TDAM 114 filters the candidate capabilities and services based on the ontology relationships maintained in the TDA knowledge base. The TCSS module 806 may generate a second design decision (SDD) data set 808. The SDD data set 808 may include selections made using the TCSS module 806 and the functional design diagram 123.

A COTS module 810 may receive the SDD data set 808 and allow selection of particular COTS products that may be selected and represented in the initial functional design diagram 123. The COTS module 810 may retrieve a set of COTS based on the "implementService" relationship (see FIG. 7). The appropriate COTS products may be provided to a user for selection. The COTS module 810 may generate a third design decision (TDD) data set 812 that may include the SDD data set 808 with the COTS products selected through the COTS module 810.

The TDD data set 812 may be received by a distribution module (DIST) 814 that distributes the components and classes of the functional design diagram 123 across tiers. In one example, if a component or class requires presence in multiple tiers, the distribution module 814 may automatically split them into more fine grained component and classes for distribution. In one example, a routine may be used by the distribution module 814 for creation of a UML-based diagram as shown in Table 4 below:

TABLE 4 proc getTierForClass(UML - Class cl)
t ← ⊥
t ← $t_1$, where $t_1$ is an instance of TierClas such that hasStereotype($t_1$) contains the stereotype of cl.
return t
end proc
for all UML - Components comp do
capabilityList ← TechnicalCapability instances requred by comp
{Assigned manually}
tierList ← ∅
for all tc in capaiblityList do
tierList ← instances of TierClass with which tc is associated
end for
end for
for each UMLClass cl in comp,tierList ← tierList ∪ getTierForClass(cl)
for all t ∈ tierList do
Split comp to a sub-component $comp_t$ and assign to t.
for all UML-Class cl in comp do
if (t = getTierForClass(cl)), assign cl to $comp_t$.
end for
end for
end for
for all UML-Class cl that are not associated with an ycomponet do
if (t ← getTierForClas(cl)) ≠ ⊥, assign cl to t.
end for If a class or component is not assigned to a tier, the distribution module 814 may mark the unassigned class or component for user intervention, as show in Table 4. The distribution module 814 may generate a fourth design decision (FoDD) data set 816 configured to include processing of the functional design diagram 123 by the distribution module 814. The FoDD data set 816 may be received by a modification module 818 allowing user input to modify the information used to generate the technical design diagram 125. The modified diagram information data set 820 may be received by a final design diagram generation (FDDG) module 822 to generate the technical design diagram 125. The technical design diagram 125 may be displayed on the display 115 as the displayed design diagram 102 discussed with regard to FIG. 1. In one example, the FDDG module 822 may generate the technical design diagram 125 by converting each tier to a diagram package, such as UML package. The FDDG module may also convert each sub-component in a tier to a package under each tier package. The FDDG module 822 may also place each class assigned to a tier (or tier sub-component) inside an appropriate package. The FDDG module 822 may also create a package under an appropriate tier for each COTS product selected through the TDAM 114.

Figure 9:
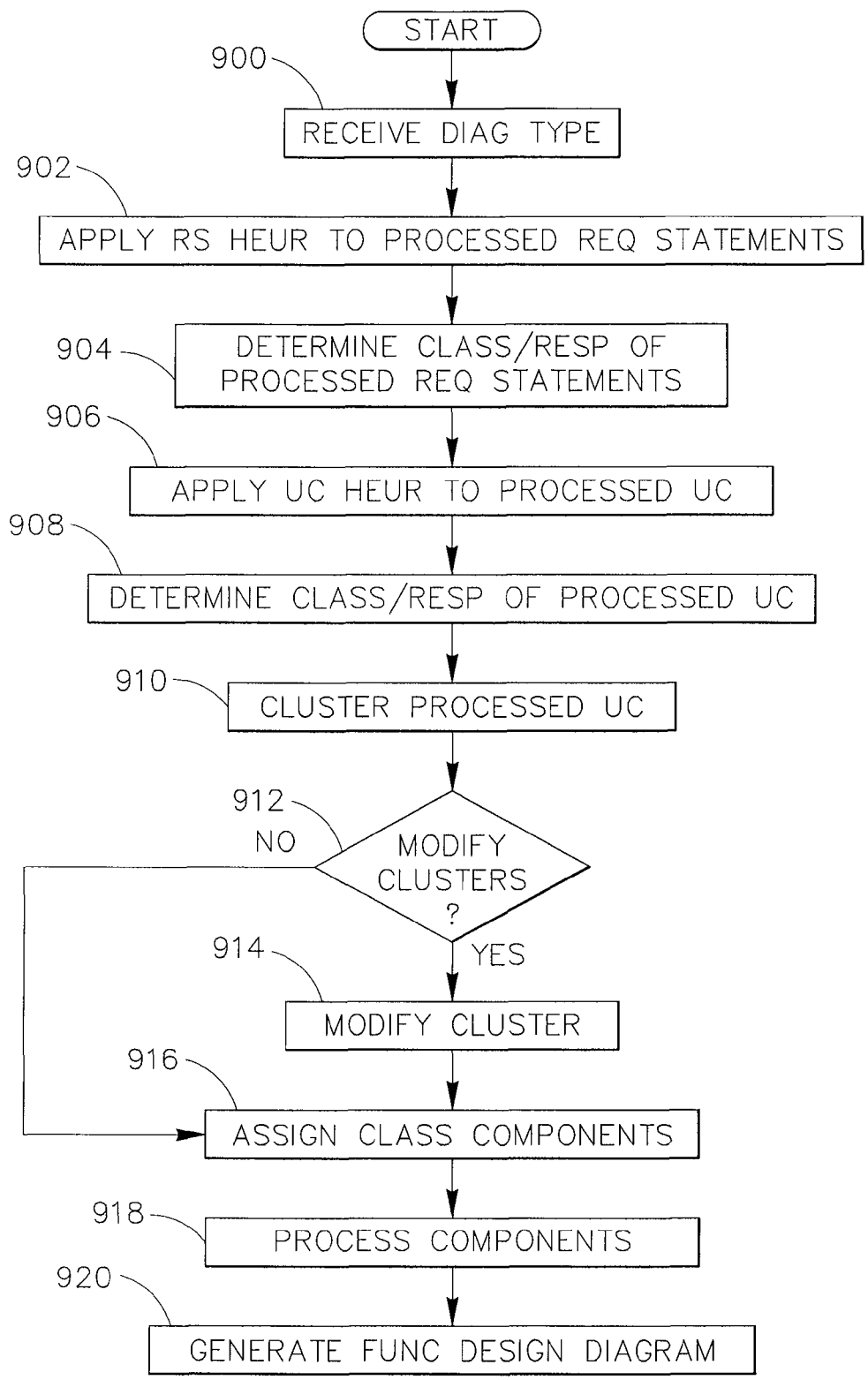
FIG. 9 is an example operational flow diagram for the functional design assistant module of FIG. 2.
Figure 10:
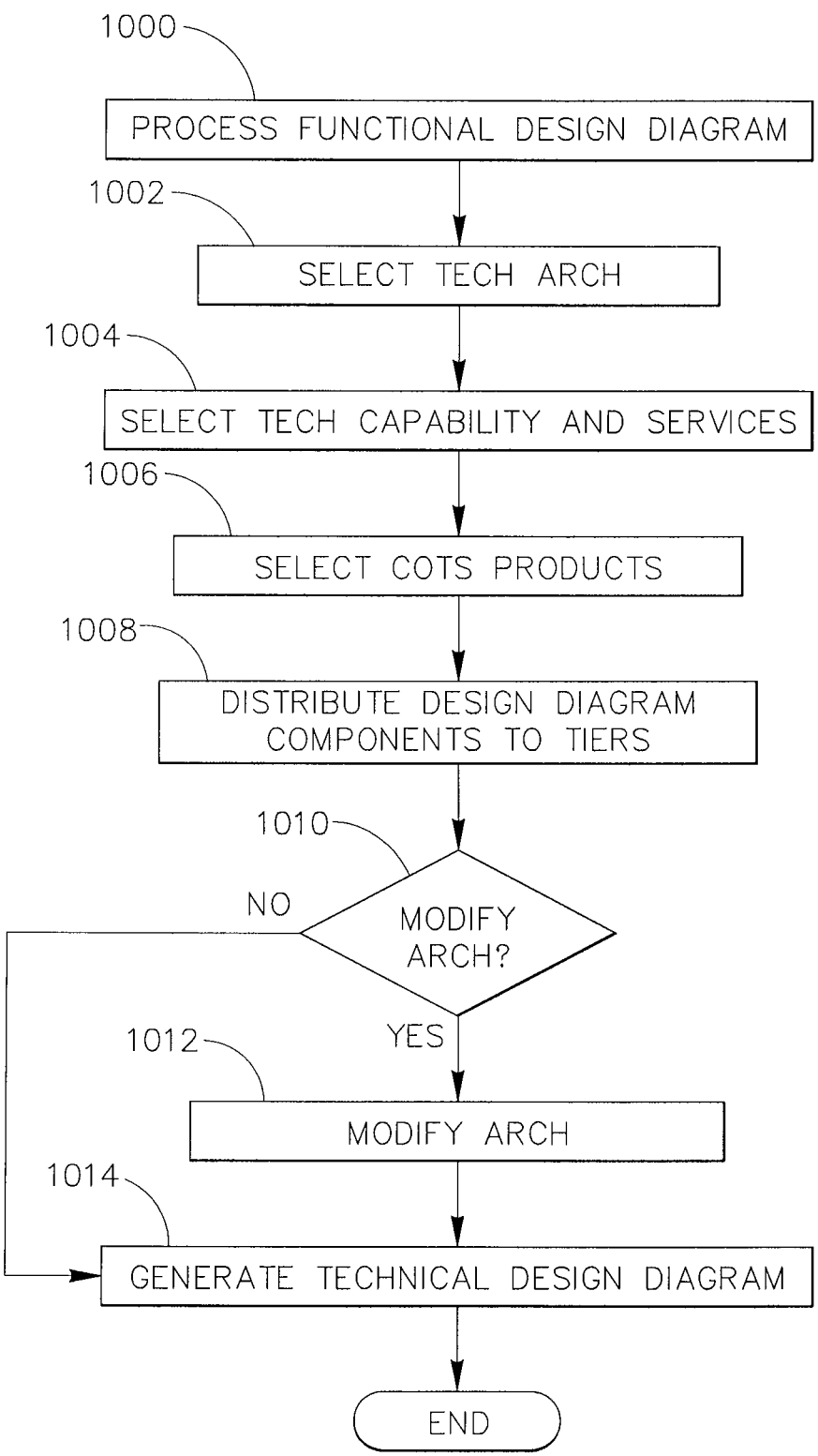
FIG. 10 is an example operational flow diagram for the technical design assistant module of FIG. 8.

FIGS. 9-10 show an example of an operational flow diagram illustrating the operation of the DAT 100. In FIG. 9 operation of the FDAM 112 is shown. The DAT 100 may receive the particular diagram type desired to be generated based on input from the GUI 117 (block 900). The FDAM 112 of the DAT 100 may receive a processed requirements specification 104 from the RSPM 116 received from the GUI 117 and apply the RS heuristic rules 300 from the RS heuristics data set 124 to the processed requirement statements 118 (block 902). The FDAM 112 may determine the classes and responsibilities of the processed requirement statements 118 (block 904).

The FDAM 112 may apply the UC heuristic rules 400 from the UC heuristics data set 126 to the processed use cases 120 (block 906). The FDAM 112 may determine the class and responsibilities of the processed use cases 120 (block 908). The FDAM 112 may cluster the processed use cases 120 (block 910). The FDAM 112 may determine if modification of the use case clusters is desired (block 912). If modification is desired, the processed use case clusters may be modified based on received input (block 914).

The FDAM 112 may assign candidate classes to the components previously identified (block 916). In one example, assignment of candidate classes may be performed using an affinity-based operation shown in Table 4. The FDAM 112 may process the identified components (block 918) and determine of candidate classes identified in both the use cases and requirement statements. If a candidate class in a processed requirement statement 118 is present in the processed use cases 120, the responsibilities and attributes found for these candidate classes are appended to previously-assigned classes. If not, the candidate class may be designated as unclassified or as an entity class. Candidate classes not involved in any processing steps may be candidates for representing data or human entity. Any classes that do not have responsibilities may be designated by the TDAM 114 as entity classes. Any other candidate classes may be assigned to a default component and may be subsequently altered by a user. Based on the components identified, the TDAM 114 may generate a functional design diagram (block 920), such as the functional design diagram 123, which may be transmitted to the display 115.

In FIG. 10, the TDAM 114 may process the functional design diagram 123 (block 1000). Upon processing the functional design diagram 123, the TDAM 114 may allow selection of a particular technical architecture (block 1002). Upon selection of the technical architecture, the TDAM 114 may allow selection of technical capability and services (block 1004). The TDAM 114 may then allow selection of particular COTS products that may be used in the system to be represented through a design diagram (block 1006). Upon selection of the COTS products, the TDAM 114 may distribute design diagram components to the existing tiers (block 1008). The TDAM 114 may determine if modification of the current form of the design diagram is desired (block 1010). If modification is desired, the TDAM 114 may modify the current form the design diagram using any received modifications (bloc 1012) and subsequently generate the technical design diagram 125 (block 1014). If no modifications are desired, the TDAM 114 may generate the technical design diagram 125, which may be transmitted on the display 115.

Figure 11:
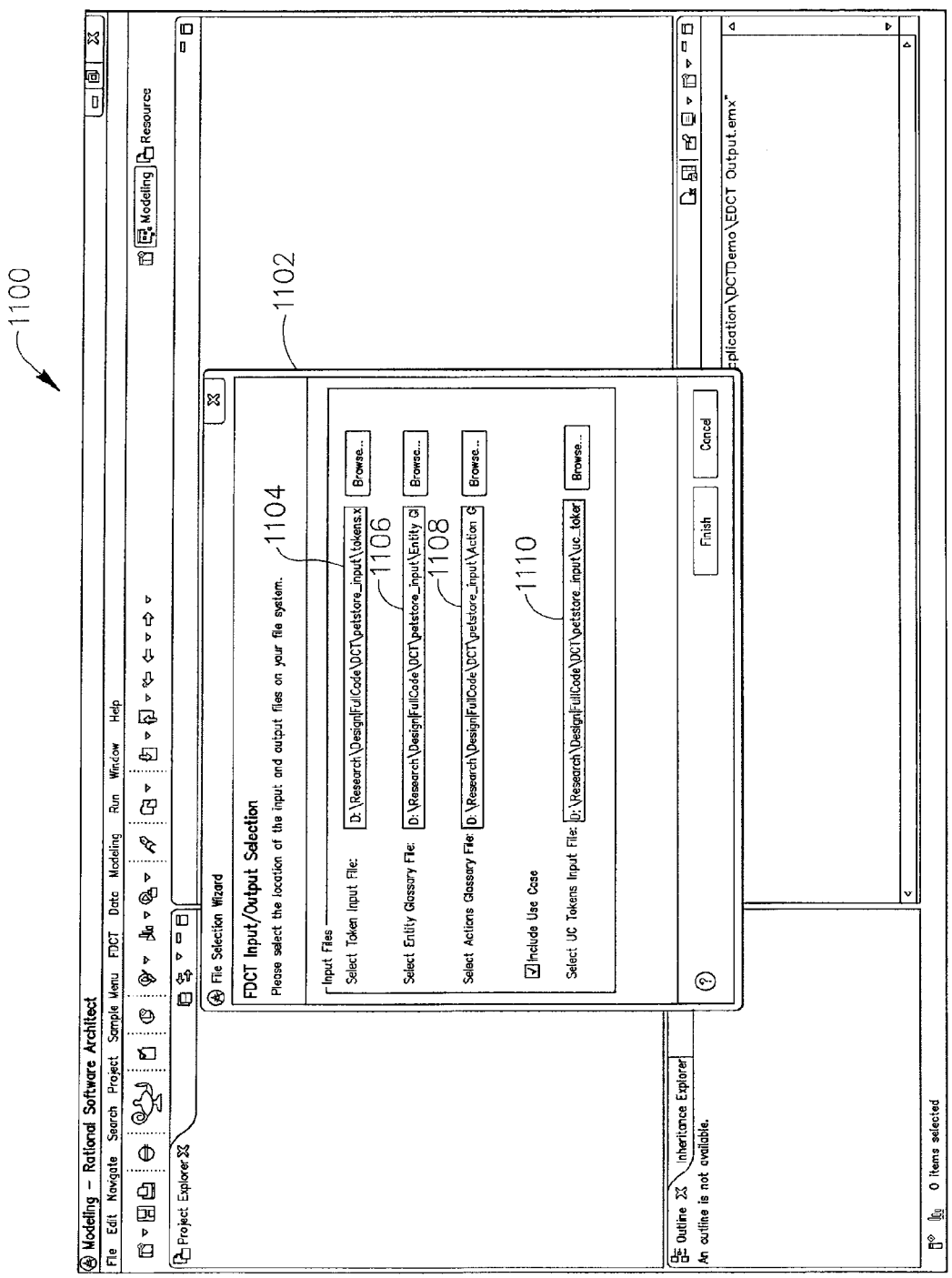
FIGS. 11-17 are an example operation of an interface used for implementing the design assistant tool of FIG. 1.

FIGS. 11-16 show an example of an implementation of the DAT 100. In FIG. 11, an interface 1100 may be provided through the GUI 117 and/or the display 115. The interface 1100 may allow a user to interact with the DAT 100. In the example of FIG. 11, the DAT 100 may be implemented through the Rational Software Architect. The interface DAT 100 may allow a user to select various files to generate the functional design diagram 102. In one example, the interface 1100 may include a file selection window 1102. The file selection window 1102 may include an input file selection field 1104, an entity glossary file selection field 1106, an action glossary file selection field 1108, and an optional use case file selection field 1110. Upon selection of the various files, the "Finish" button may be selected.

Figure 12:
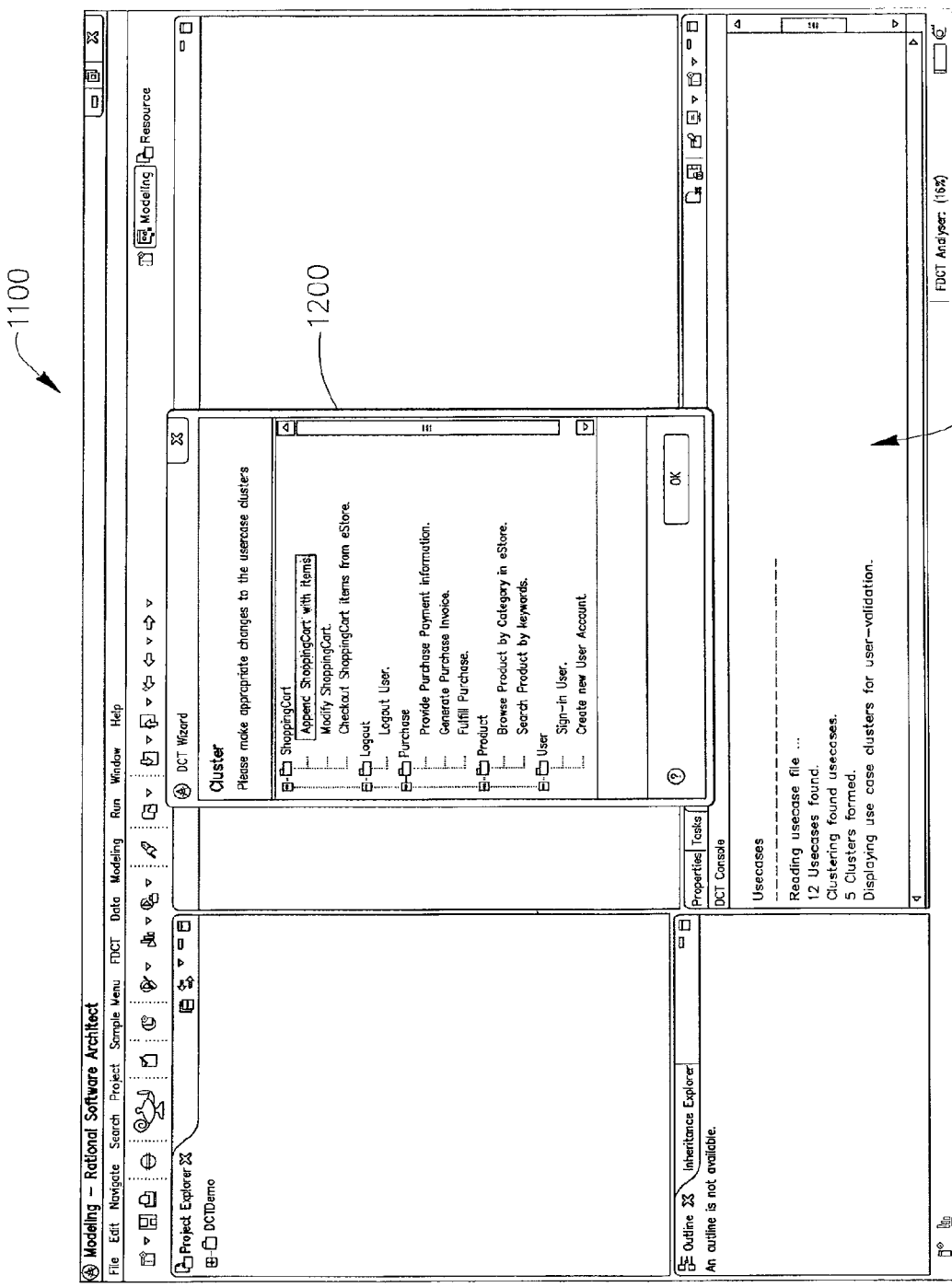

FIG. 12 shows an example of a use case cluster modification window 1200 that may be used to modify the various use case clusters generated by the FDAM 112. In one example, the use case cluster window 1200 may present the clusters in the hierarchical manner as shown in FIG. 12. The clusters shown in the window 1200 may be moved to allow a desired cluster configuration to be achieved. The interface 100 includes a status window 1202 that may provide the current state of operation of the DAT 100. For example, in FIG. 12, the status window 1202 is indicating that the use case cluster window 1200 being shown is awaiting user validation.

Figure 13:
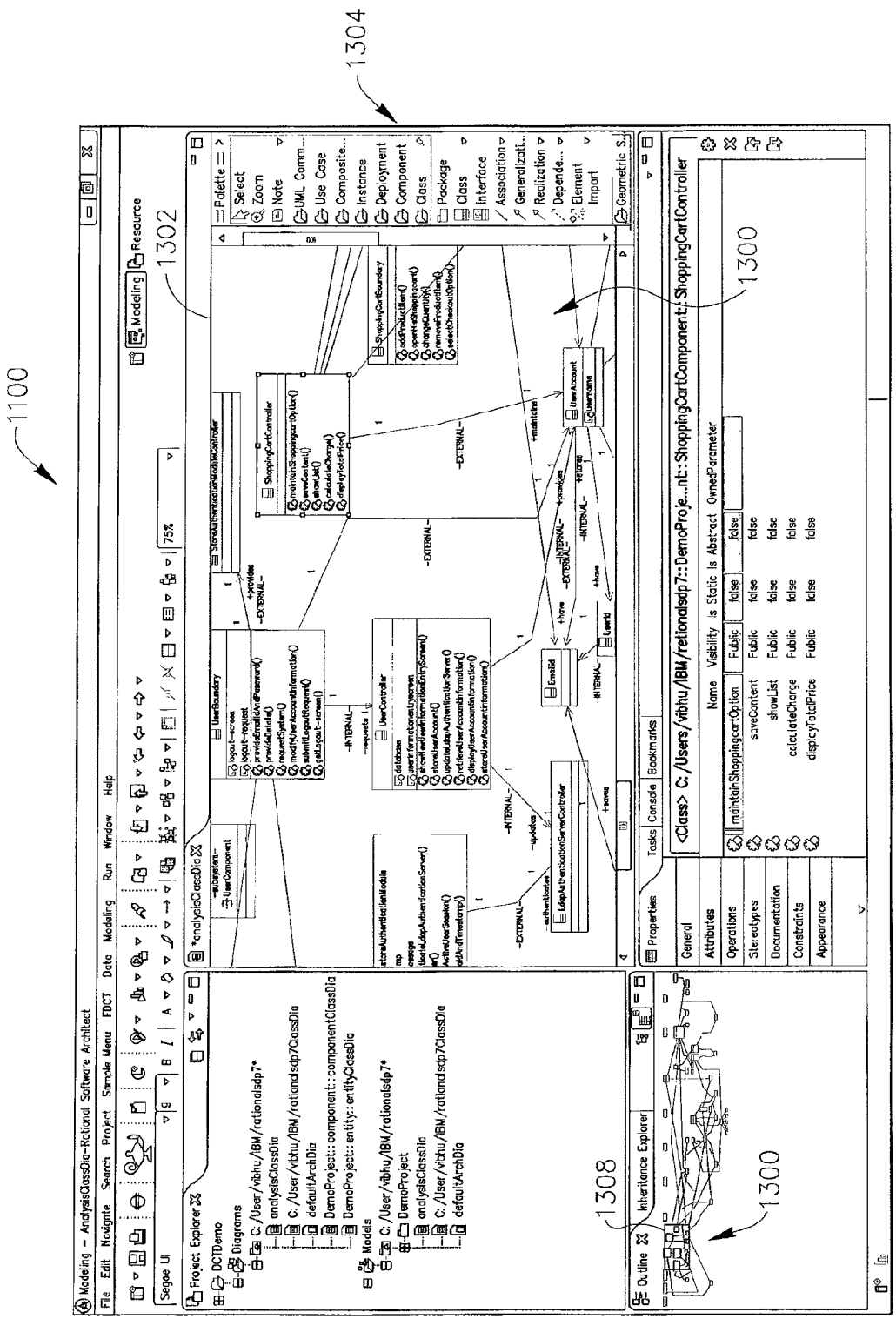

FIG. 13 shows the interface 1100 presenting a functional design diagram 1300, such as the functional design diagram 123. The functional design diagram 1300 may be generated by the FDAM 112 and presented in a diagram window 1302. The interface 1100 may include diagram manipulation tools 1304 allowing the functional design diagram 1300 to be modified by a user. The interface 1100 may also include an outline window 1306 allowing a highlight window 1308 to be positioned on the diagram 1300 allowing the portion of the functional design diagram 1300 within the highlight window 1308 to be shown in greater detail in the diagram window 1302.

Figure 14:
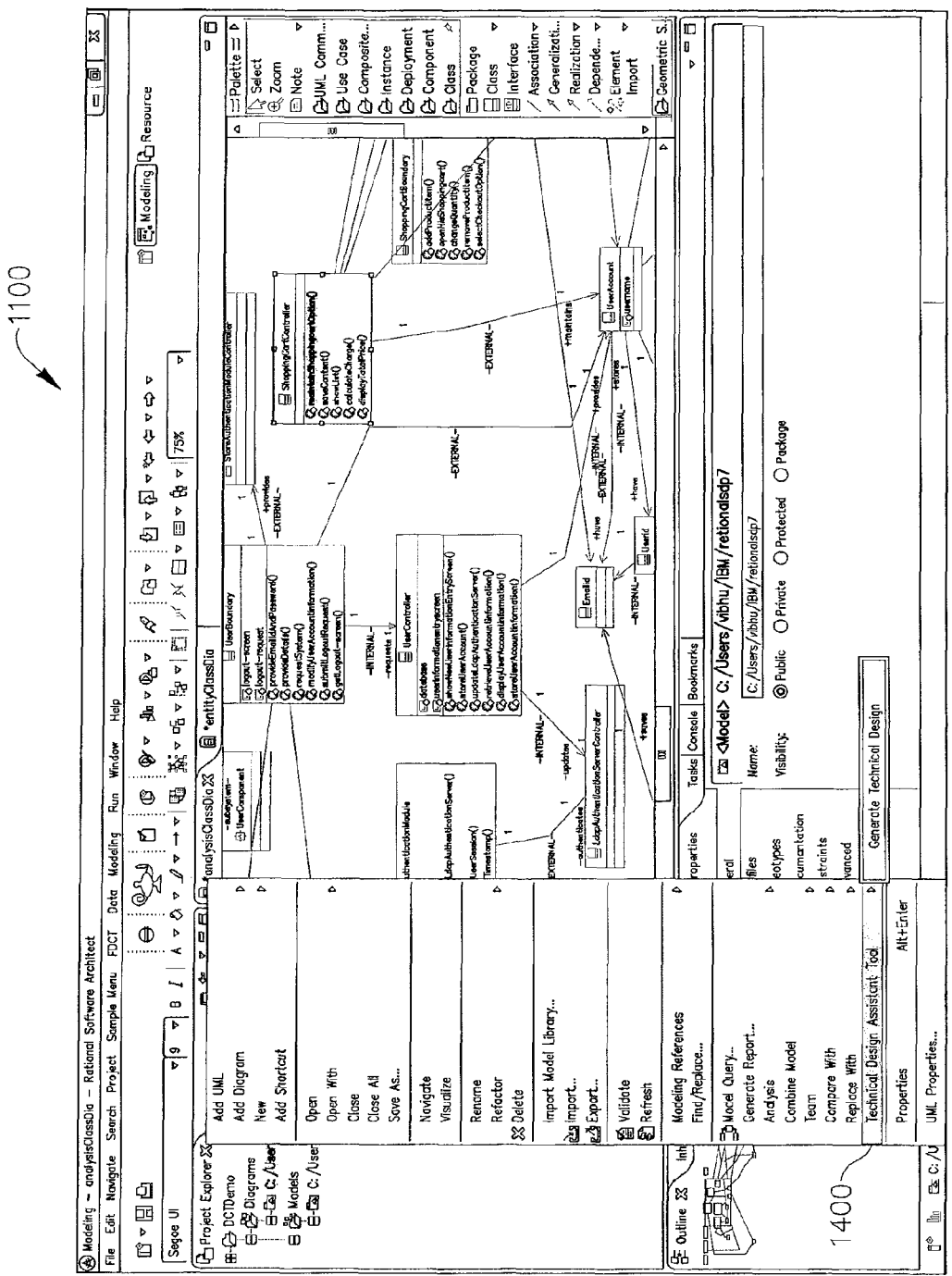
Figure 15:
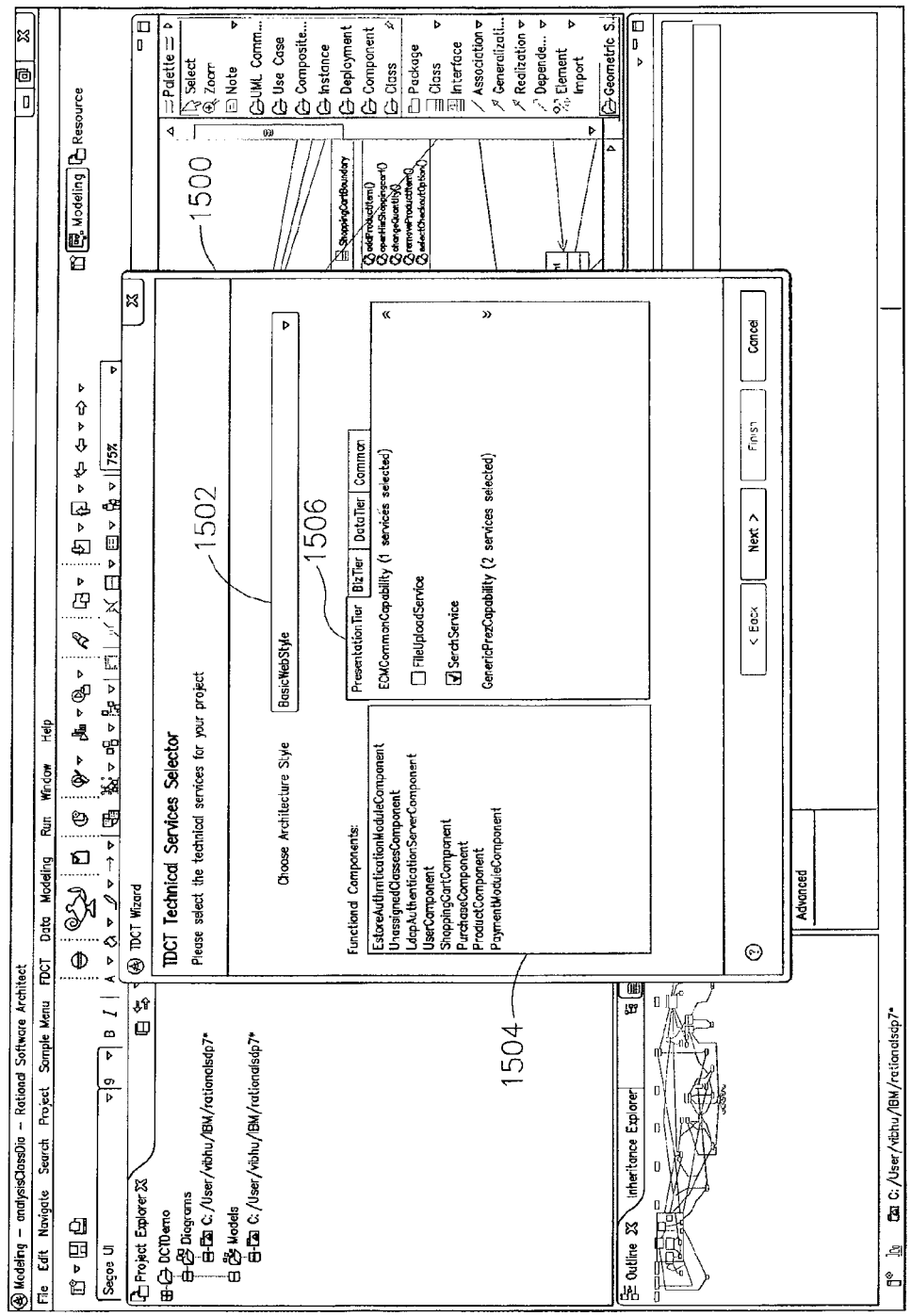

Upon generation of functional design diagram 1300, the diagram may be further modified using the TDAM 114 to generate a technical design diagram. In one example, the interface may allow a drop-down-style selection window to provide a Technical Design Assistant Tool option 1400 as shown in FIG. 14. The Technical Design Assistant Tool option 1400 may allow selection of "Generate Technical Design" that may initiate the TDAM 114. Upon initiation of the TDAM 114, the interface 1100 may include a technical services selector window 1500 as shown in FIG. 15. The window 1500 may include various selection fields. For example, the window 1500 may include an architecture style selection field 1502. The field 1502 may coincide with the TD module 802 of the TDAM 114 allowing a user to select a particular architecture style.

Figure 16:
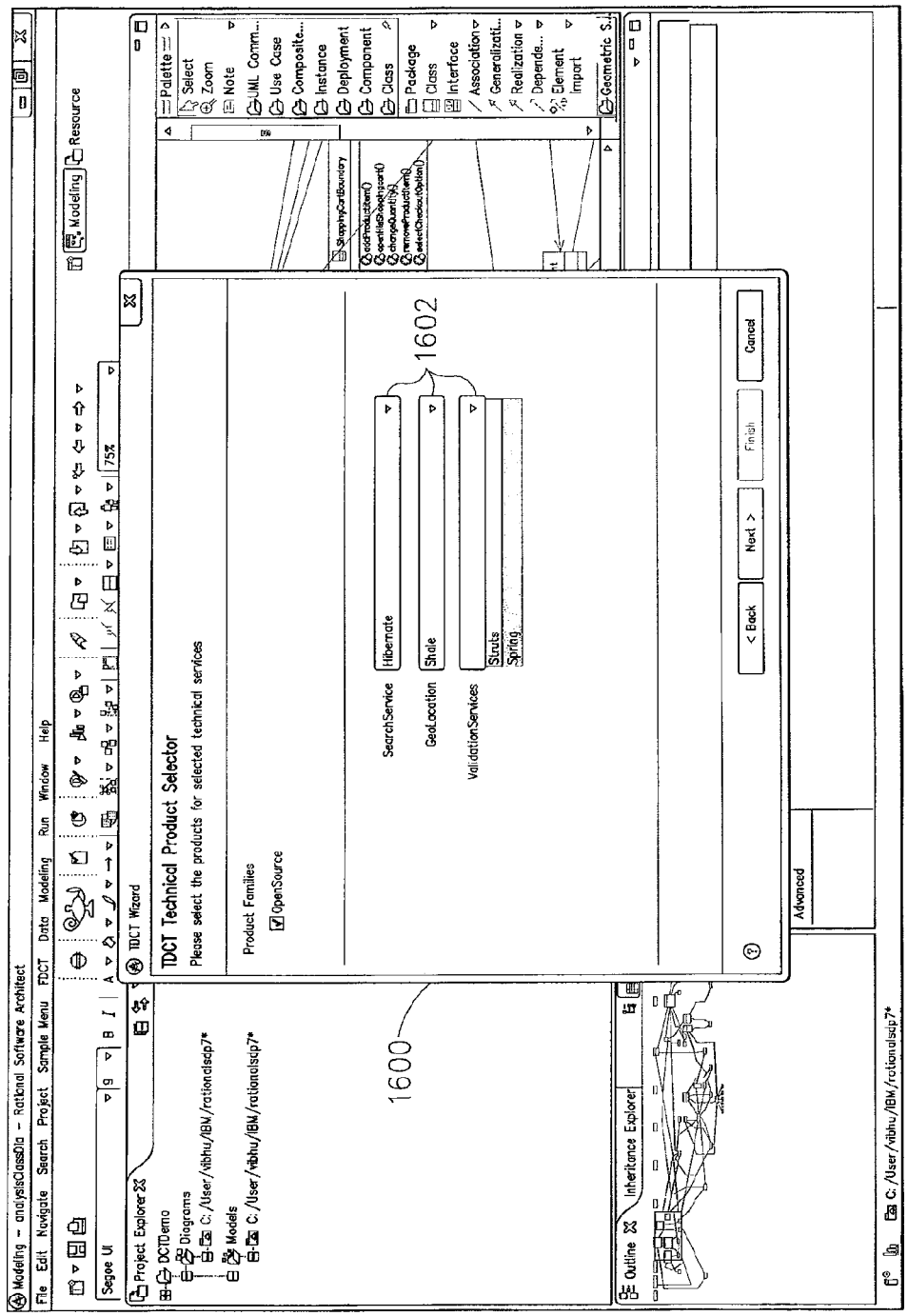
Figure 17:
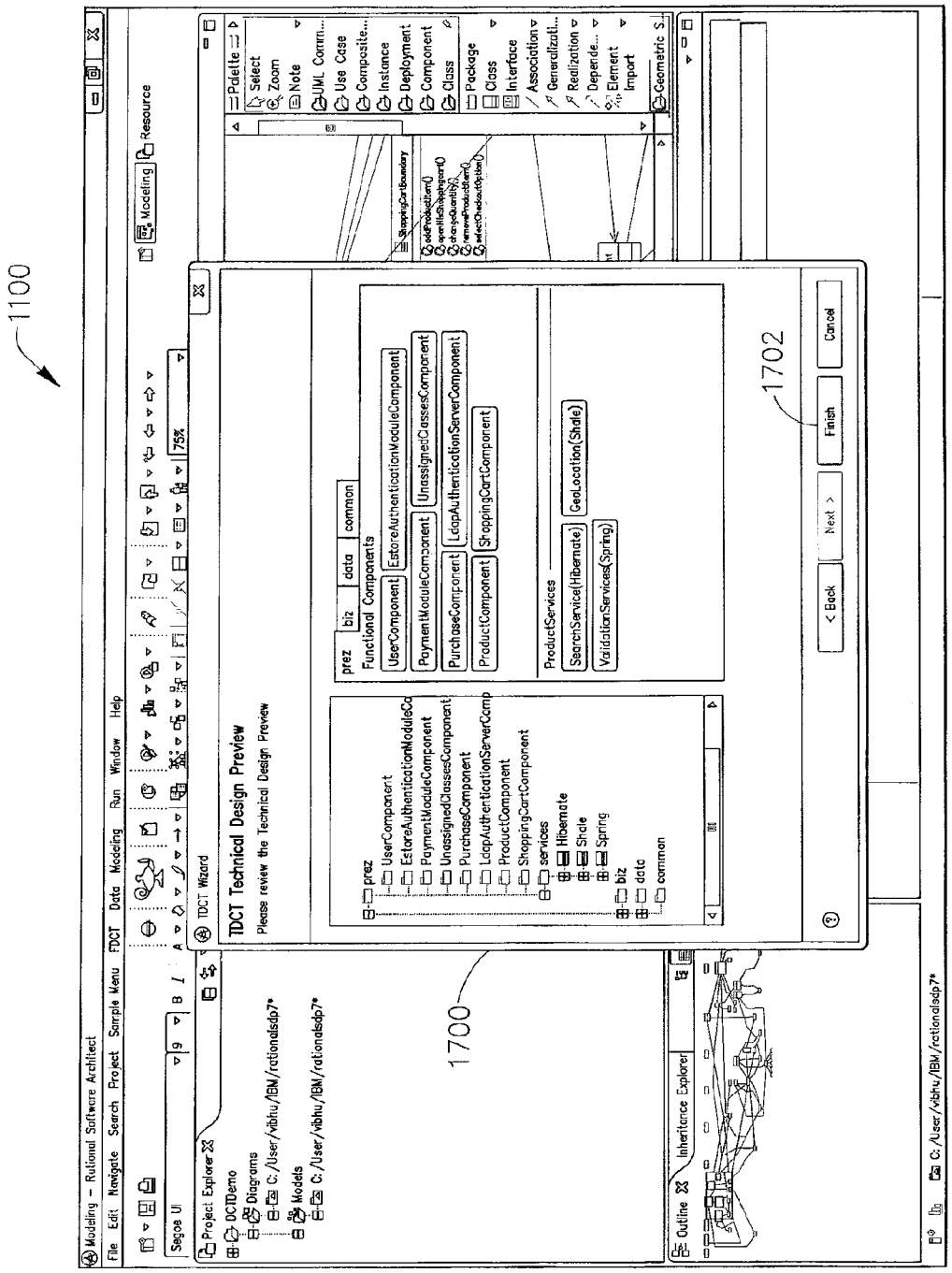

The window 1500 may also include a functional component selection field 1404 and a service selection field 1506. The selection fields 1504 and 1506 may coincide with the TCSS module 806 of the TDAM 114. After selections are completed, selection the "Next" button may provide a product selection window 1600 as shown in FIG. 16 allowing selection of particular COTS products that may be available. The product selection window may coincide with the COTS module 810 of the TDAM 114. The window 1600 may include various selection fields 1602 allowing selection of various COTS products that may be used. Upon selection of the desired COTS products, selection of the "Next" button may provide a preview window 1700 shown in FIG. 17. The preview window 1700 may include interactive fields allowing modification of the functional design diagram 1300. The preview window 1700 may coincide with the modification module 812 of the TDAM 114. Upon selection of the "Finish" button 1702, the technical design diagram may be completed by the TDAM 114 and may be presented in the diagram window 1302.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

We claim:

1. A system for creating a system diagram model, the system comprising:
   one or more processors or circuits;
   a plurality of glossary data sets stored on a memory device;
   a heuristics data set stored on the memory device, wherein the heuristics data set includes a plurality of heuristic rules including one or more requirement statement heuristic rules and one or more use case heuristic rules;
   a use case cluster module executable by the one or more processors or circuits operable to identify system components by clustering processed use cases; and
   a functional design creation module executable by the one or more processors or circuits;
   wherein the one or more processors or circuits are operable to:
   receive a processed requirements specification defining functionality of a system, wherein the processed requirements specification includes at least one processed requirement statement and at least one processed use case;
   retrieve the plurality of glossary data sets, and the heuristics data set;
   identify requirement statement classes and responsibilities based on the one or more requirement statement heuristic rules;
   identify use case classes and responsibilities based on the one or more use case heuristic rules;
   identify system components by the use case cluster module by clustering the at least one processed use case;
   determine overlapping of requirement statement classes and use case classes and append responsibilities and attributes identified for a particular requirement statement class to a corresponding overlapped use case class;
   generate a plurality of functional design diagram components based on the at least one processed requirement statement, the at least one processed use case, at least one system component identified by the use case cluster module, at least one of the plurality of glossary data sets, and the plurality of heuristic rules, wherein the plurality of functional design components includes at least one entity included in the system and at least one relationship associated with the at least one entity;
   generate a functional design diagram based on the functional design diagram components, wherein the functional design diagram is representative of the system, and wherein the functional design diagram includes at least one diagram element representative of the at least one entity and a relationship indicator representative of the at least one relationship; and
   transmit the functional design diagram to at least one display.

2. The system for creating a system diagram model of claim 1, wherein the functional design creation module comprises a requirement statement heuristics module executable by the one or more processors or circuits to:
   apply a set of the requirement statement heuristic rules and at least one of the plurality of glossary data sets to the at least one processed requirement statement; and
   identify at least one candidate class and at least one relationship in the at least one processed requirement statement to include in the functional design diagram.

3. The system for creating a system diagram model of claim 2, wherein the requirement statement heuristics module is further executable to identify at least one attribute of the at least one processed requirement statement in response to application of the plurality of heuristic rules.

4. The system for creating a system diagram model of claim 2, wherein the functional design creation module comprises a use case heuristics module executable by the one or more processors or circuits to:
   assign at least one processing class to each system component identified by the use case cluster module, based on the one or more use case heuristic rules;
   apply a set of the one or more use case heuristic rules and at least one of the plurality of glossary data sets to the at least one processed use case to:
   identify at least one other candidate class in the at least one processed use case and assign to the at least one other candidate class at least one responsibility indicated by the at least one processed use case to include in the functional design diagram; or
   in instances when the at least one processed use case belongs to a particular cluster, identify a processing class indicated by the at least one processed use case, wherein the identified processing class is assigned to a system component that corresponds to the particular cluster, and assign a responsibility indicated by the at least one processed use case to the identified processing class to include in the functional design diagram.

5. The system for creating a system diagram model of claim 4, wherein the use case heuristics module is further executable to identify at least one attribute of the at least one processed use case based on application of the plurality of heuristic rules.

6. The system for creating a system diagram model of claim 4, wherein the at least one processed use case comprises a plurality of processed use cases, and wherein the use case cluster module is configured to cluster terms present in the plurality of processed use cases based on similarity of the terms.

7. The system for creating a system diagram model of claim 4, wherein the functional design creation module comprises an analysis class component assignment module configured to assign the at least one candidate class and the at least one other candidate class to respective components included within the plurality of functional design diagram components.

8. The system for creating a system diagram model of claim 7, wherein the functional design creation module comprises a design distribution module configured to distribute the respective functional design diagram components within the functional design diagram.

9. The system for creating a system diagram model of claim 8, wherein the distributed respective functional design diagram components are entities within the functional design diagram.

10. The system of claim 1 further comprising a technical design module executable by the one or more processors or circuits to:
receive at least one input indicative of a diagram modification;
modify the functional design diagram in response to receipt of the diagram modification to generate a technical design diagram;
generate the technical design diagram; and
transmit the technical design diagram to the at least one display.

11. The system for creating a system diagram model of claim 1, wherein the clustering of processed use cases creates one or more use case clusters that are made available via a graphical user interface (GUI) that allows a user to modify the one or more use case clusters of processed use cases.

12. A computer-implemented method of generating a diagram representing a system on a display, the method comprising:
receiving, by a processor, a processed requirements specification describing behavior of a system, wherein the processed requirements specification includes a plurality of processed requirement statements and a plurality of processed use cases;
retrieving, by the processor, a plurality of glossary data sets, and a heuristics data set, from a memory device, wherein the heuristics data set includes one or more requirement statement heuristic rules and one or more use case heuristic rules;
identifying requirement statement classes and responsibilities based on the one or more requirement statement heuristic rules;
identifying use case classes and responsibilities based on the one or more use case heuristic rules;
executing, by the processor, a use case cluster module and identifying system components by clustering the plurality of processed use cases by the use case cluster module;
determining overlapping of requirement statement classes and use case classes and appending responsibilities and attributes identified for a particular requirement statement class to a corresponding overlapped use case class;
generating, by the processor, at least one functional design diagram component based on the processed requirements specification, at least one system component identified by the use case cluster module, at least one of the plurality of glossary data sets, and the heuristics data set;
generating, by the processor, a functional design diagram based on the at least one functional design diagram component, the functional design diagram being representative of the system;
converting, by the processor, the functional design diagram to a technical design diagram based on a received input; and
transmitting, by the processor, the technical design diagram to at least one display.

13. The computer-implemented method of claim 12, wherein converting, with the processor, the functional design diagram comprises selecting, with the processor, a technical architecture based on the received input to be represented by the technical design diagram.

14. The computer-implemented method of claim 12, wherein converting, by the processor, the functional design diagram comprises selecting, with the processor, a technical capability and service to be represented by the technical design diagram.

15. The computer-implemented method of claim 12, wherein converting, by the processor, the functional design diagram comprises selecting, with the processor, at least one product to be represented by the technical design diagram.

16. The computer-implemented method of claim 12, wherein converting, by the processor, the functional design diagram comprises distributing, with the processor, components and classes across tiers represented by the technical design diagram.

17. The computer-implemented method of claim 12, wherein generating, by the processor, at least one functional design diagram component based on the processed requirements specification comprises applying, with the processor, the heuristics data set to the plurality of processed requirement statements to identify at least one candidate class and at least one relationship to be represented by the functional design diagram.

18. The computer-implemented method of claim 12, wherein generating, by the processor, at least one functional design diagram component based on the processed requirements specification comprises applying, with the processor, the heuristics data set to the plurality of processed use cases to identify at least one candidate class and at least one responsibility of the candidate class to be represented in the functional design diagram.

19. A non-transitory computer-readable medium comprising a plurality of instructions executable by a processor, the computer-readable medium comprising:
instructions to receive a processed requirements specification describing behavior of a system, wherein the processed requirements specification includes a plurality of processed requirement statements and a plurality of processed use cases;
instructions to retrieve a plurality of glossary data sets and a heuristics data set wherein the heuristics data set includes a plurality of heuristic rules including one or more requirement statement heuristic rules and one or more use case heuristic rules;
instructions to identify requirement statement classes and responsibilities based on the one or more requirement statement heuristic rules;
instructions to identify use case classes and responsibilities based on the one or more use case heuristic rules;
instructions for a use case cluster module, to identify system components by clustering the plurality of processed use cases;
instructions to determine overlapping of requirement statement classes and use case classes and append responsibilities and attributes identified for a particular requirement statement class to a corresponding overlapped use case class;
instructions to generate at least one functional design diagram component based on the processed requirements specification, at least one of the system components identified by the use case cluster module, at least one of the plurality of glossary data sets, and the heuristics data set;
instructions to generate a functional design diagram based on the at least one functional design diagram component, the functional design diagram being representative of the system;
instructions to convert the functional design diagram to a technical design diagram in response to a received input; and instructions to transmit the technical design diagram to a display.

20. The computer-readable medium of claim 19 further comprising:
   instructions to apply the heuristic data set and at least one of the plurality of glossary data sets to the plurality of processed requirement statements; and
   instructions to identify, based on application of the heuristics data set, from the plurality of processed requirement statements at least one candidate class and at least one relationship in at least one of the plurality of processed requirement statements to include in the functional design diagram.

21. The computer-readable medium of claim 19, further comprising:
   instructions to assign at least one processing class to each of the system components identified by the use case cluster module, based on the one or more use case heuristic rules;
   instructions to apply the heuristics data set and at least one of the plurality of glossary data sets to the plurality of processed use cases; and
   instructions to identify, based on application of the heuristics data set, from the plurality of processed use cases at least one candidate class and assign to the at least one candidate class at least one responsibility to include in the functional design diagram; or
   in instances when at least one of the plurality of processed use cases belongs to a particular cluster, instructions to identify a processing class indicated by the at least one of the plurality of processed use cases, wherein the processing class is assigned to a system component which corresponds to the particular cluster, and assign a responsibility indicated by the at least one of the plurality of processed use case to the identified processing class to include in the functional design diagram.

* * * * *

UNITED STATES PATENT AND TRADEMARK OFFICE
CERTIFICATE OF CORRECTION

PATENT NO. : 9,015,011 B2  
APPLICATION NO. : 13/173918  
DATED : April 21, 2015  
INVENTOR(S) : Santonu Sarkar et al.

Page 1 of 1

It is certified that error appears in the above-identified patent and that said Letters Patent is hereby corrected as shown below:

On the Title Page

In the Title

Left column, item (54), before "ASSISTANT TOOL" insert --DESIGN--.

In the Specification

Column 1, in the title, before "ASSISTANT TOOL" insert --DESIGN--.

Signed and Sealed this  
First Day of March, 2016

Michelle K. Lee  
*Director of the United States Patent and Trademark Office*